United States Patent
Jacobs et al.

(10) Patent No.: US 10,072,896 B2
(45) Date of Patent: Sep. 11, 2018

(54) MODULAR THERMAL ENERGY STORAGE SYSTEM

(71) Applicant: LoCap Energy, LLC, Dallas, TX (US)

(72) Inventors: Dexter E. Jacobs, Dallas, TX (US); Zachary Sokoloff, Austin, TX (US)

(73) Assignee: LoCap Energy, LLC, Dallas, TX (US)

( * ) Notice: Subject to any disclaimer, the term of this patent is extended or adjusted under 35 U.S.C. 154(b) by 0 days.

(21) Appl. No.: 15/491,247

(22) Filed: Apr. 19, 2017

(65) Prior Publication Data
US 2017/0307302 A1    Oct. 26, 2017

Related U.S. Application Data

(60) Provisional application No. 62/326,270, filed on Apr. 22, 2016.

(51) Int. Cl.
*F28D 17/00*    (2006.01)
*F28D 20/02*    (2006.01)
(Continued)

(52) U.S. Cl.
CPC ....... *F28D 20/021* (2013.01); *F28D 20/0056* (2013.01); *F28D 20/023* (2013.01);
(Continued)

(58) Field of Classification Search
CPC ............... F28D 20/021; F28D 20/0034; F28D 20/0056; F28D 20/023; F28D 20/026;
(Continued)

(56) References Cited

U.S. PATENT DOCUMENTS

| | | |
|---|---|---|
| 4,405,010 A | 9/1983 | Schwartz |
| 4,637,219 A | 1/1987 | Grose |

(Continued)

OTHER PUBLICATIONS

Wu, Shuangmao et al., "Thermal Performance Simulations of a Packed Bed Cool Thermal Energy Storage System Using N-tetradecane as Phase Change Material," International Journal of Thermal Sciences 49.9 (2010), pp. 1752-1762.
(Continued)

*Primary Examiner* — Davis Hwu
(74) *Attorney, Agent, or Firm* — Spencer C. Patterson

(57) ABSTRACT

A modular thermal energy storage system for storing and transferring thermal energy at a wide range of temperatures. The system includes processing control circuitry, heat transfer fluid (HTF), piping, valves, pumps, a thermal energy source, and a reconfigurable thermal energy storage (TES) tank implemented in one or more insulated shipping containers. Different types of replaceable thermal energy storage material in the TES tank can store thermal energy in a range of −30° F. to temperatures greater than +200° F. The system receives HTF from a customer load and charges the HTF to a desired temperature. Charged HTF in the TES tank transfers thermal energy to and from the storage material. When the stored thermal energy is needed, the system passes a non-charged thermal fluid through the TES tank to draw out the thermal energy through the charged HTF, and transfers the thermal energy to the customer load.

22 Claims, 16 Drawing Sheets

(51) Int. Cl.
*F28F 27/00* (2006.01)
*F28D 20/00* (2006.01)

(52) U.S. Cl.
CPC ............ *F28D 20/026* (2013.01); *F28F 27/00* (2013.01); *F28D 2020/006* (2013.01); *F28D 2020/0026* (2013.01); *F28D 2020/0069* (2013.01); *Y02E 60/142* (2013.01); *Y02E 60/145* (2013.01)

(58) Field of Classification Search
CPC ....... F28D 2020/0026; F28D 2020/006; F28D 2020/0069; F28F 27/00; Y02E 60/142; Y02E 60/145; B60H 1/00492
USPC .......................................................... 165/10
See application file for complete search history.

(56) References Cited

U.S. PATENT DOCUMENTS

| | | | |
|---|---|---|---|
| 4,928,493 A | 5/1990 | Gilbertson et al. | |
| 5,255,526 A | 10/1993 | Fischer | |
| 5,386,709 A | 4/1995 | Aaron | |
| 5,465,585 A | 11/1995 | Mornhead et al. | |
| 5,501,268 A | 3/1996 | Stoval et al. | |
| 5,571,232 A | 11/1996 | Davis et al. | |
| 6,681,593 B1 | 1/2004 | Gundlach | |
| 7,152,413 B1 | 12/2006 | Anderson | |
| 7,284,747 B2 | 10/2007 | Fielder et al. | |
| 9,441,861 B2 | 3/2016 | Diamond et al. | |
| 9,593,866 B2 | 3/2017 | Baldwin | |
| 2012/0279679 A1* | 11/2012 | Soukhojak | B60H 1/00492 165/10 |
| 2014/0110080 A1* | 4/2014 | Bergan | F28D 20/0056 165/10 |
| 2015/0159959 A1 | 6/2015 | Petrovic | |
| 2015/0241137 A1 | 8/2015 | France et al. | |
| 2015/0316288 A1* | 11/2015 | Erickson | F28D 20/0034 126/714 |

OTHER PUBLICATIONS

Cabeza, L.F. et al., "Heat Transfer Enhancement in Water When Used as PCM in Thermal Energy Storage," Applied Thermal Engineering 22.10 (2002), pp. 1141-1151.

Li, Xiao-Yan et al., "Review of Development of Phase Change Cold Storage Technology for Food Cold Chain Application," Proceedings of the 2015 International Forum on Energy, Environment Science and Materials (2015), pp. 927-930.

* cited by examiner

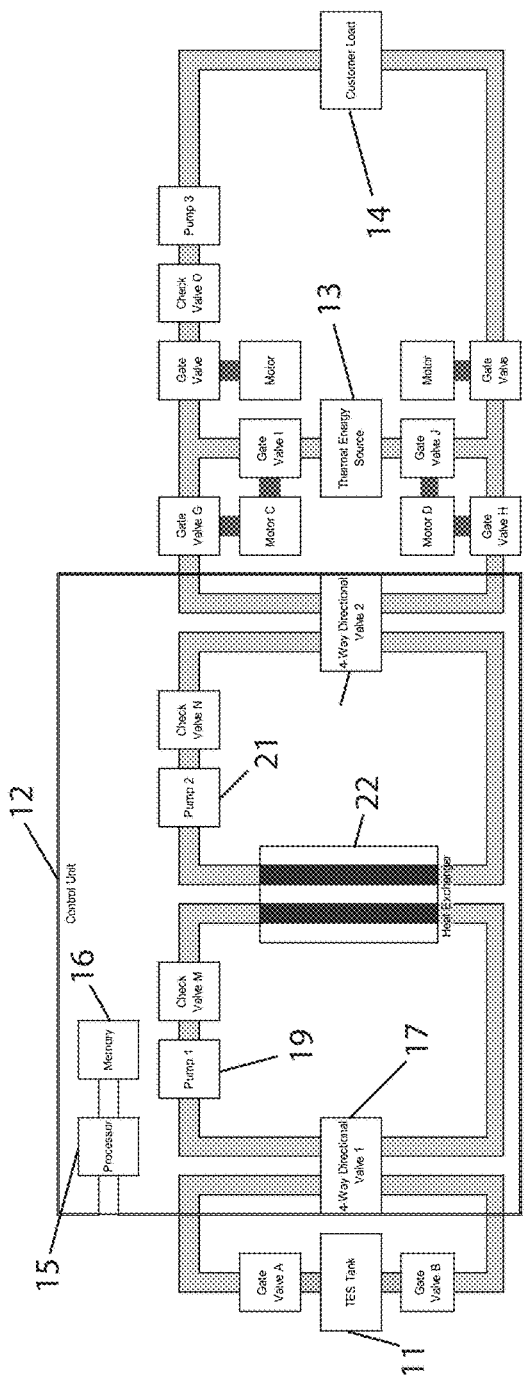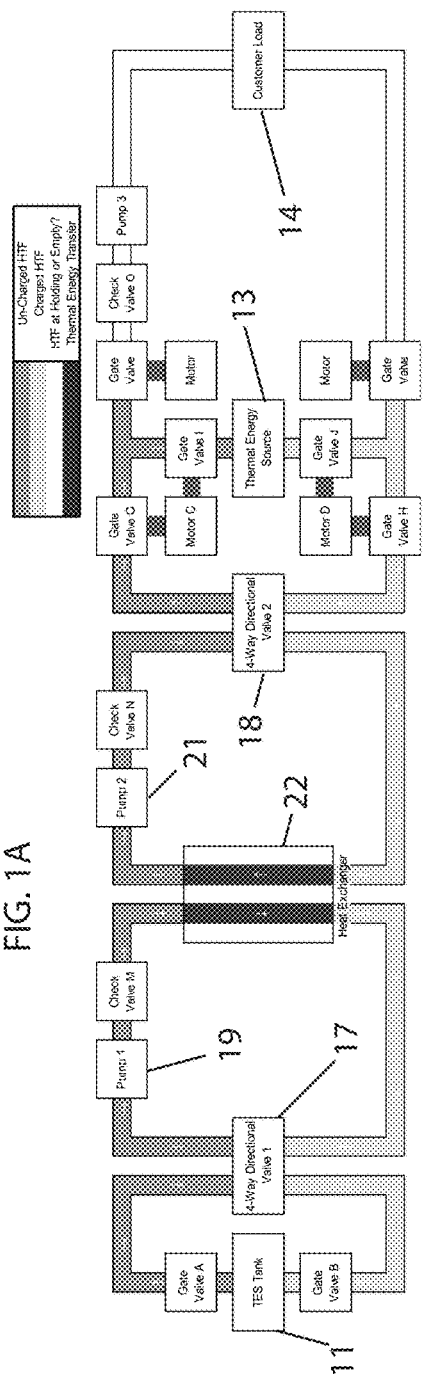
FIG. 1A
FIG. 1B

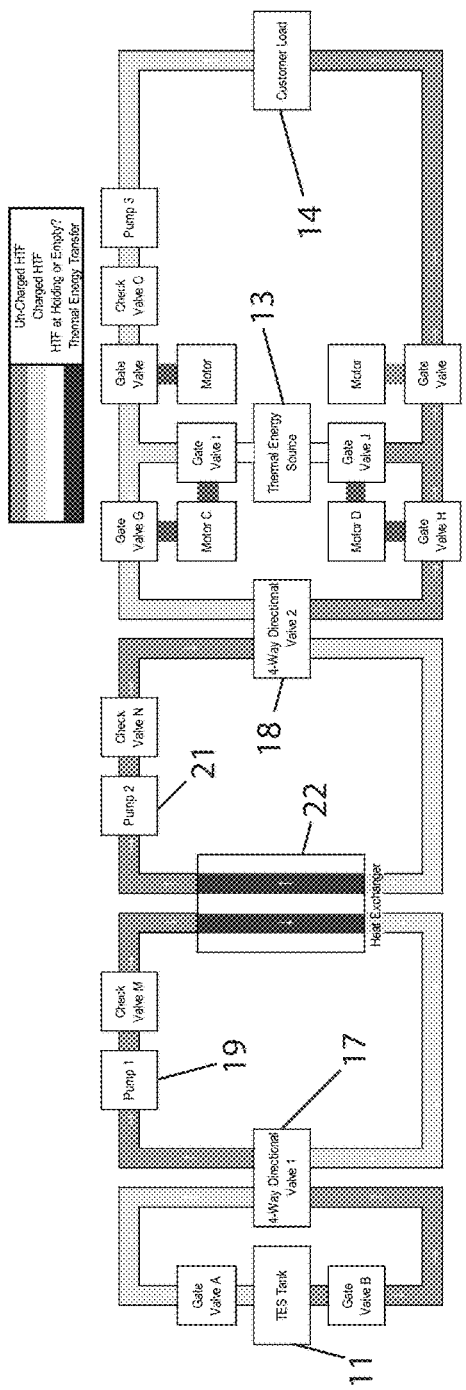
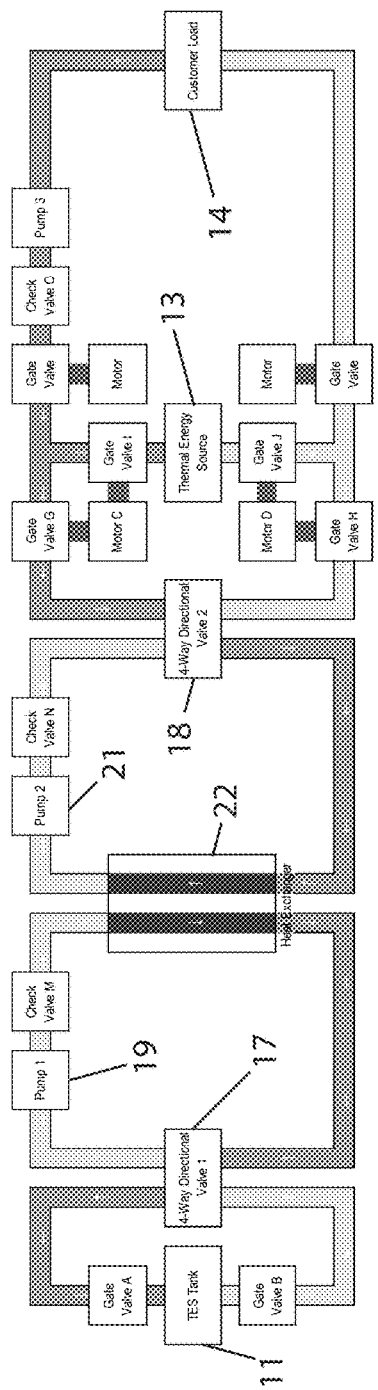
FIG. 1E
FIG. 1F

MODULAR THERMAL ENERGY STORAGE SYSTEM

CROSS-REFERENCE TO RELATED APPLICATIONS

This application claims the priority benefit under 35 U.S.C. § 119(e) of U.S. Provisional Application No. 62/326,270 filed on Apr. 22, 2016, the disclosure of which is incorporated herein by reference in its entirety.

TECHNICAL FIELD

The present disclosure relates generally to systems and methods for storing and transferring thermal energy at various temperatures. In particular, the present disclosure is directed toward a Modular Thermal Energy Storage System (MTESS) capable of storing and transferring thermal energy at a wide range of temperatures.

BACKGROUND

With the ever-growing market for energy conservation systems within the United States and globally, there is increasing demand and interest for systems and techniques that enable energy conservation, while demonstrating economic and environmental responsibility as well.

Heating, ventilation, and air conditioning (HVAC) is the technology of indoor and vehicular environmental comfort. Its goal is to provide thermal comfort and acceptable indoor air quality. HVAC systems account for a significant share of energy consumption in most commercial and industrial buildings. Many industrial energy consumers also require process heating and process cooling systems for manufacturing operations. These systems are often energy intensive and can become quite expensive when run during peak electrical demand hours.

Thermal Energy Storage (TES) systems may be used for HVAC/process applications to shift some of the energy requirements to off-peak hours. The efficiency gains and operational flexibility afforded by TES systems for HVAC/process applications have made investment in this type of infrastructure very attractive to consumers. Many industrial energy consumers also often produce excess "waste heat" from various manufacturing processes, which can be converted into useable electricity utilizing Organic Rankine Cycle (ORC) generators or other "heat-to-power" generators. This "free" power generation is only useful if the energy is produced during times of energy demand, which may not correlate with the times when waste heat is produced. Energy storage methods afford the ability to decouple this energy generation from energy consumption and provide "on-demand" power generation. Thermal energy storage is still much more cost-effective than electrochemical energy storage (batteries) and thus is more attractive to waste-heat consumers.

Many methods have been implemented for thermal energy storage at various temperatures and capacity levels; these temperatures vary between −30° F. and greater than 200° F. This variability results in a constant demand for new TES systems to be implemented, potentially increasing economic impact seen by those implementing TES systems.

SUMMARY

One drawback of the existing TES systems is that they are all fixed installations. What is needed is a modular TES system that can be readily located and relocated where needed. The Modular Thermal Energy Storage System (MTESS) disclosed herein is implemented in relocatable containers such as, for example, insulated shipping containers. Using these standardized form factors for the differing storage materials allows for greater versatility, rapid installation, and scalability. Separate from the storage apparatus, all controls, processing circuitry executing Energy Management Software (EMS), and mechanical machinery responsible for the flow of Heat Transfer Fluid (HTF) may be mounted on a transportable engine skid in the control unit.

Additionally, in existing TES systems, the discharging mode is driven by the type of storage method: either "full storage" or "partial storage". In full storage situations, an existing TES system must be able to satisfy the entire application load by itself while in the discharge mode. In partial storage situations, the existing TES system must be able to supplement the thermal energy source in satisfying the application load during the discharge mode, such that the thermal energy source output remains constant. The MTESS system disclosed herein allows for an simple change between storage methods by providing cost effective storage capacity changes via increasing or decreasing the quantity of MTESS containers.

Finally, existing TES systems are designed for a specific temperature range, often necessitating unique system designs for varying temperature range applications. For example, systems designed for storing thermal energy at temperatures suitable for low-temperature refrigeration applications (between approximately −30° F. and +40° F.) or space cooling applications at approximately +32° F., are unable to store thermal energy at temperatures suitable for high-temperature process heat applications and heat-to-power on-demand power production applications where the thermal energy is stored at temperatures greater than +200° F. The MTESS system disclosed herein represents a single, universal system design that can be configured and scaled to satisfy any temperature range application.

The disclosed MTESS solves all of the above problems.

The disclosed MTESS functions in two modes—Mode 1 (Charging) and Mode 2 (Discharging)—and is designed to handle various situations within each of the two modes, as further described below. The MTESS system design is capable of handling both storage methods (by properly scaling the storage capacity) and other potential situations that might arise in either Mode 1 or Mode 2.

The MTESS may be used for, but is not limited to: industrial, commercial, and/or municipal HVAC applications, thermal process applications, and power production applications. The system includes a number of insulated storage tanks of a standardized size and shape that can be interconnected for capacity changes. The system also includes a control unit managed by an EMS solution to control heat exchangers and pumping mechanisms for both the HTF inflow and HTF outflow, and the charging and discharging of thermal energy storage materials packed inside the insulated tanks.

According to a first embodiment, a system for storing and transferring thermal energy at a wide range of temperatures is provided. The system includes piping, valves, and pumps required for moving heat transfer fluid (HTF) to and from a customer load and within the system; a thermal energy source for adding thermal energy to the HTF for high-temperature applications and for removing thermal energy from the HTF for low-temperature applications; and a reconfigurable thermal energy storage (TES) tank configured to store thermal energy. The TES tank includes replaceable thermal energy storage material, HTF surrounding the thermal energy storage material for transferring thermal energy to and from the thermal energy storage material, and at least one diffuser pipe disposed within the HTF and connected to input/output pipes for moving the HTF into and out of the TES tank during charging and discharging phases, respectively, of the system. The TES tank is configured to operate with either a first type of thermal energy storage material that stores low-temperature thermal energy for applications requiring storage temperatures in a range of −30° F. to +200° F., or a second type of thermal energy storage material that stores high-temperature thermal energy for applications requiring storage temperatures greater than +200° F.

According to a further embodiment, a method in a thermal energy storage system for storing and transferring thermal energy at a wide range of temperatures is provided. The method includes configuring a reconfigurable TES tank to store thermal energy in either a first type of thermal energy storage material that stores low-temperature thermal energy for applications requiring storage temperatures in a range of −30° F. to +200° F., or a second type of thermal energy storage material that stores high-temperature thermal energy for applications requiring storage temperatures greater than +200° F.; receiving from a customer load, HTF having an input temperature; altering the input temperature of the HTF to a desired storage temperature, thereby creating charged HTF; and storing thermal energy from the charged HTF in the thermal energy storage material in the TES tank. When the thermal energy stored in the TES tank is needed by the customer load, the method includes passing a non-charged thermal fluid through the TES tank to draw out the thermal energy from the thermal energy storage materials and produce charged HTF; and transferring the stored thermal energy through the charged HTF from the thermal energy storage system to the customer load.

According to a further embodiment, a modular thermal energy storage system for storing and transferring thermal energy at a wide range of temperatures is provided. The system includes processing circuitry coupled to a non-transitory memory that stores Energy Management Software (EMS) instructions; piping, valves, and pumps required for moving HTF to and from a customer load and within the system; a thermal energy source in a first thermal energy transfer loop for adding thermal energy to the HTF for high-temperature applications and for removing thermal energy from the HTF for low-temperature applications, thereby creating charged HTF; a heat exchanger for transferring thermal energy between the first thermal energy transfer loop and a second thermal energy transfer loop; and a reconfigurable thermal energy storage (TES) tank in the second thermal energy transfer loop configured to store thermal energy. The TES tank includes replaceable thermal energy storage material, wherein the TES tank is configured to operate with either a first type of thermal energy storage material that stores low-temperature thermal energy for applications requiring storage temperatures in a range of −30° F. to +200° F., or a second type of thermal energy storage material that stores high-temperature thermal energy for applications requiring storage temperatures greater than +200° F. The TES tank also includes charged HTF surrounding the thermal energy storage material for transferring thermal energy to and from the thermal energy storage material; and at least one diffuser pipe disposed within the charged HTF and connected to input/output pipes for moving the charged HTF into and out of the TES tank during charging and discharging phases, respectively, of the system. The processing circuitry, piping, valves, pumps, thermal energy source, and TES tank are implemented in one or more insulated shipping containers, thereby making the system modular and transportable. When the processing circuitry executes the EMS instructions, the processing circuitry is caused to control the system to meet the thermal energy storage requirements of varying customer applications by receiving from a customer load, HTF having an input temperature; altering the input temperature of the HTF by the thermal energy source to a desired storage temperature; and storing thermal energy from the charged HTF in the thermal energy storage material in the TES tank. When the thermal energy stored in the TES tank is needed by the customer load, the system is configured to pass a non-charged thermal fluid through the TES tank to draw out the stored thermal energy through the charged HTF; and transfer the stored thermal energy from the thermal energy storage system to the customer load by passing the charged HTF from the TES tank through the heat exchanger to transfer thermal energy from the second thermal energy transfer loop to the first thermal energy transfer loop.

The solution according to the present disclosure provides a number of advantages. The modular system design allows for instant scalability. Each transportable container includes interconnections that allow for a combination of storage containers as well as the connection of control modules and other equipment as needed. This scalability is adjustable upon demand as well as the control modules. Each can be custom tailored to fit the needs of the end-user. Different versions of the EMS may be utilized for different end-user applications. Data and controls throughout the system can be integrated into the end-user's system for optimal usage of the MTESS.

Further features and benefits of embodiments of the present disclosure will become apparent from the detailed description below.

BRIEF DESCRIPTION OF THE DRAWINGS

In the following section, the invention will be described with reference to exemplary embodiments illustrated in the figures, in which:

FIG. 1A is a simplified block diagram of an overall system layout of the MTESS in an exemplary embodiment of the present disclosure;

FIG. 1B is a simplified block diagram of the MTESS showing the flow of fluid in a TES Charge Only mode in the embodiment of FIG. 1A;

FIG. 1E is a simplified block diagram of the MTESS showing the flow of fluid in a TES Discharge, Source Off and Load Draw (Full Storage) mode in the embodiment of FIG. 1A;

FIG. 1F is a simplified block diagram of the MTESS showing the flow of fluid in a TES Discharge, Source Supply and Load Draw (Partial Storage) mode in the embodiment of FIG. 1A;

DETAILED DESCRIPTION

Figure 1C:
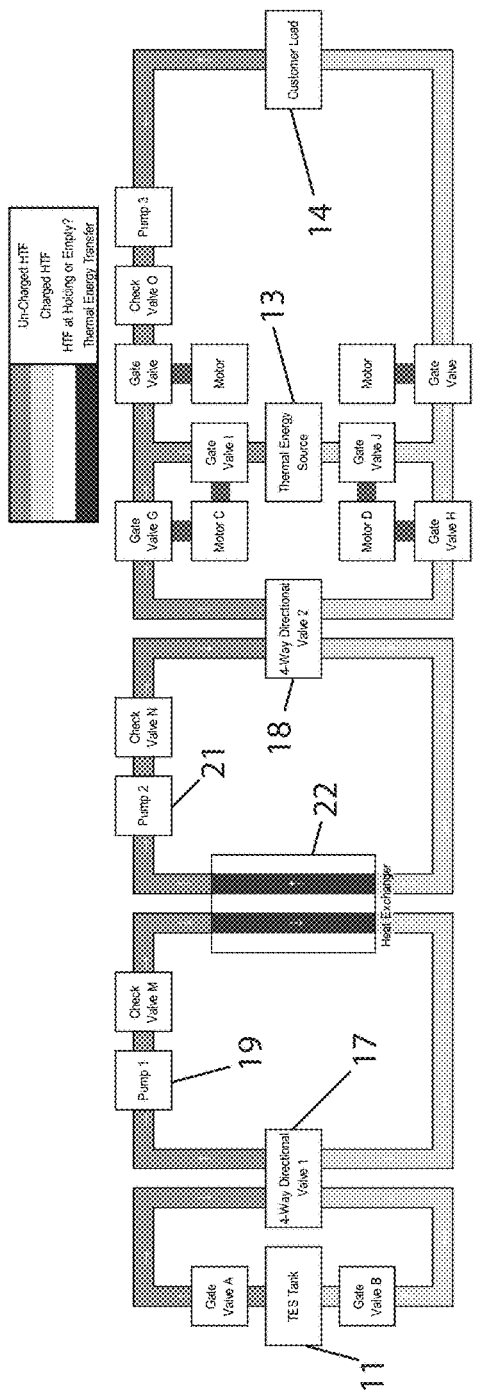
FIG. 1C is a simplified block diagram of the MTESS showing the flow of fluid in a TES Charge and Load Draw mode in the embodiment of FIG. 1A.

The present invention will now be described more fully hereinafter with reference to the accompanying drawings, in which preferred embodiments of the invention are shown. In the below, for purposes of explanation and not limitation, specific details are set forth in order to provide a thorough understanding of the present invention. It will be apparent to one skilled in the art that the present invention may be practiced in other embodiments that depart from these specific details.

Those skilled in the art will further appreciate that the functions explained herein of the EMS system may be implemented using hardware circuitry or a combination of hardware and software. The software may operate in conjunction with a programmed microprocessor or a general purpose computer, using an Application Specific Integrated Circuit (ASIC) and/or Digital Signal Processors (DSPs). It will also be apparent that when the present invention is described as a method, it may also be embodied in a computer processor and a non-transitory memory coupled to the processor, wherein the memory is encoded with one or more programs that perform the method when executed by the processor.

The MTESS functions in two modes—Mode 1 (Charging) and Mode 2 (Discharging)—and is designed to handle various situations within each of the two modes, as further described below. In the charging mode, the Thermal Energy Source or Auxiliary Thermal Energy Source applies thermal energy to the HTF to then be sent to the TES tank for storage. In the Discharging mode, a non-charged thermal fluid is run through the TES tank to draw out the charged HTF. The MTESS system design is capable of handling both storage methods (by properly scaling the storage capacity) and other potential situations that might arise in either Mode 1 or Mode 2.

FIG. 1A is a simplified block diagram of an overall system layout of the MTESS 10 in a first exemplary embodiment of the present disclosure. The major components include a Thermal Energy Storage (TES) Tank 11, a Control Unit 12, a Customer Thermal Energy Source 13, and a Customer Thermal Energy Load 14. The Control Unit includes a control processing circuit, which includes a processor 15 coupled to a non-transitory memory 16 that stores Energy Management Software (EMS) instructions. When the processor executes the EMS instructions, the processor is caused to send control instructions to the various components of the MTESS for operating in the different modes. The Control Unit 12 also includes a first 4-way directional valve 17, a second 4-way directional valve 18, a first pump (Pump-1) 19, a second pump (Pump-2) 21, and an interface heat exchanger 22. Note that the Thermal Energy Source 13 may add thermal energy (for example, for high-temperature storage applications), or may withdraw thermal energy (for example, for low-temperature storage applications). The components of the Control Unit may be mounted, for example, on an engine skid (not shown).

This embodiment illustrates an example configuration having a single TES tank 11, paired with equipment necessary to move the HTF, control the temperature of the HTF, and transfer thermal energy to and from the customer load 14. However, in other embodiments, or in a solution integrated with customer equipment, there could be multiple TES tanks to provide greater capacity for storing thermal energy or to switch between storage temperature applications (for example from low-temperature storage to high-temperature storage, or vice versa). In one embodiment, a customer-owned second TES tank and heat exchanger are utilized to transfer the thermal energy back into the customer's system (i.e., load) in certain use cases.

HTF flows between the storage tanks and the heat exchangers in the control unit in order to transfer thermal energy back and forth between the application load 14, Thermal Energy Source 13, and the MTESS system. The MTESS system integrates into the existing application thermal energy transfer loop using the control valves, heat exchangers and the EMS, all located in the control unit 12.

An MTESS Thermal Energy Transfer Loop connects in parallel with an Application Thermal Energy Transfer Loop in order to provide maximum operational flexibility. The MTESS Thermal Energy Transfer Loop encompasses the HTF lines running between the TES tank 11 and the interface heat exchanger 22. This loop carries thermal energy (either hot or cold) to and from storage. The Application Thermal Energy Transfer Loop encompasses the HTF lines running between the customer application load 14 and the customer Thermal Energy Source 13. This loop delivers thermal energy (either hot or cold) to satisfy the customer load. The interface heat exchanger 22 couples the MTESS Thermal Energy Transfer Loop with the Application Thermal Energy Loop by branching off of the HTF lines on either side of the Thermal Energy Source 13 using, for example, 3-way tee valves.

FIG. 1B is a simplified block diagram of the MTESS 10 showing the flow of fluid in a TES Charge Only mode in the embodiment of FIG. 1A. The TES Charge Only mode describes a scenario in which the customer provides the Thermal Energy Source 13 for the HTF being used to transfer thermal energy to the MTESS during off peak hours or during a time outside of its normal operating hours. Here the charged HTF exits the customer-provided Thermal Energy Source and passes through 4-Way Valve-2 18 and enters the Heat Exchanger 22 provided by the MTESS. With the thermal energy transferred to the HTF used in the TES tank 11, the HTF then enters the TES tank to be stored for later use. The HTF that initially contained the thermal energy is now re-circulated back to the Thermal Energy Source provided by the customer. This process continues until the proper storage temperatures are reached, at which time the EMS within the control unit sends a signal to the pumps and heat exchangers and corresponding valves to deactivate, or close, to complete the cycle. The fluid that exits the TES tank after it has transferred the thermal energy it had stored to the thermal energy materials being used in this scenario, is then recirculated back to the heat exchanger via Pump-1 19 to be re-charged by the customer-provided Thermal Energy Source.

FIG. 1C is a simplified block diagram of the MTESS 10 showing the flow of fluid in a TES Charge and Load Draw mode in the embodiment of FIG. 1A. The TES Charge and Load Draw mode describes a scenario in which the TES tank 11 is being charged by the customer-provided Thermal Energy Source 13 as in FIG. 1B, while the Thermal Energy Source is also being used by the customer during normal operating hours.

Figure 1D:
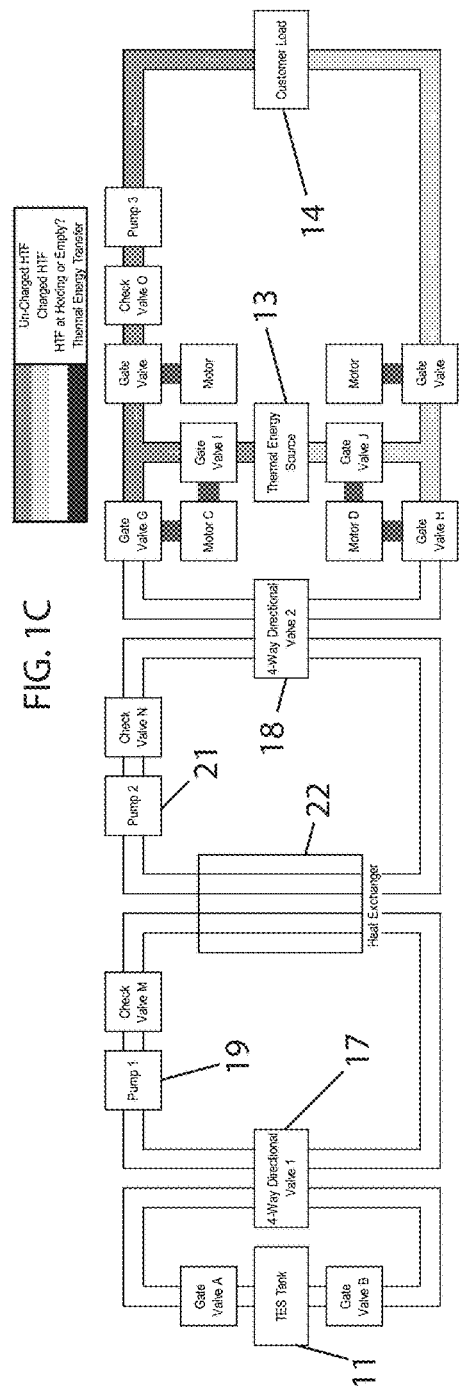
FIG. 1D is a simplified block diagram of the MTESS showing the flow of fluid in a Load Draw Only mode in the embodiment of FIG. 1A.

FIG. 1D is a simplified block diagram of the MTESS 10 showing the flow of fluid in a Load Draw Only mode in the embodiment of FIG. 1A. The Load Draw Only mode represents a scenario in which the TES tank 11 is in a holding mode, where the thermal energy that has been transferred to the TES tank is waiting to be utilized by the customer. During this time, the customer may be providing its own needs as seen appropriate for the intended use. This scenario may occur regularly after the TES tank has completed its charging cycle.

FIG. 1E is a simplified block diagram of the MTESS 10 showing the flow of fluid in a TES Discharge, Source Off and Load Draw (Full Storage) mode in the embodiment of FIG. 1A. The TES Discharge, Source Off and Load Draw (Full Storage) mode represents a scenario in which the customer is drawing out the thermal energy stored by the MTESS. Here the thermal energy stored in the thermal energy storage materials of the TES tank 11 is drawn out of those materials by passing a non-charged HTF through the TES tank, and exiting the TES tank with a charged HTF, which is then routed back to the heat exchanger 22 via Pump-1 19. The thermal energy is then transferred to the HTF used in the customer-provided Thermal Energy Source 13 and sent to the customer load 14 through the second 4-way directional valve 18 via Pump-2 21. Non-charged HTF from the customer load 14 is then recirculated back to the heat exchanger 22 in the control unit 12 of the MTESS, to be used to transfer the stored thermal energy back to the customer.

FIG. 1F is a simplified block diagram of the MTESS 10 showing the flow of fluid in a TES Discharge, Source Supply and Load Draw (Partial Storage) mode in the embodiment of FIG. 1A. The TES Discharge, Source Supply and Load Draw (Partial Storage) mode represents a scenario in which the thermal energy stored in the TES tank 11 is supplied back to the customer load 14 in the same manner as described in the Full Storage Mode (FIG. 1E), but in addition to the thermal energy stored in the TES tank being provided back to the load, the customer is also creating a supplemental supply of thermal energy back to the load.

Figure 2A:
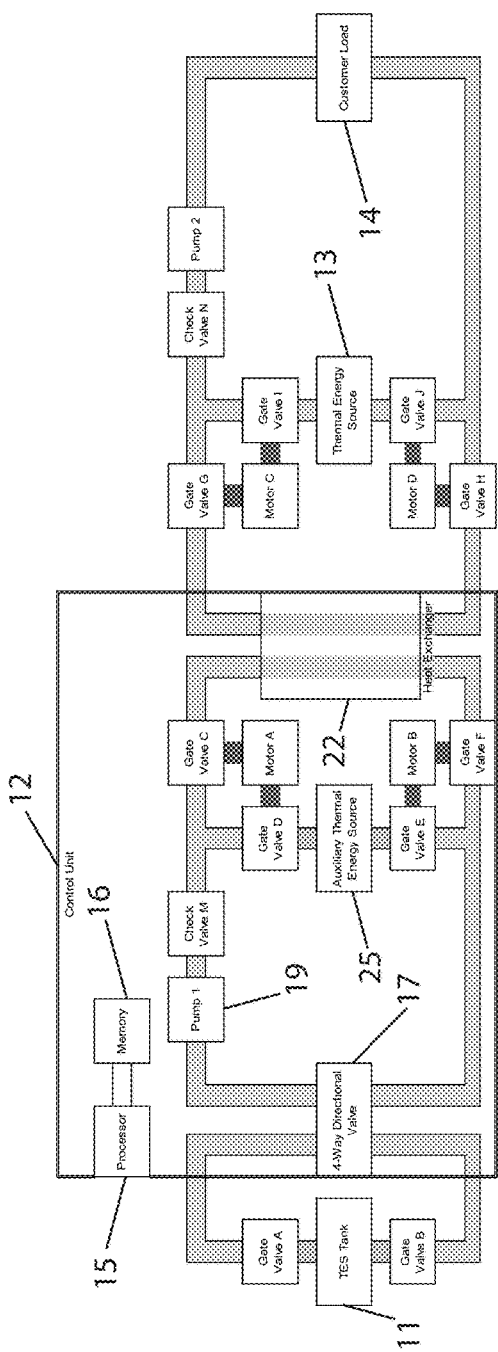
FIG. 2A is a simplified block diagram of an overall system layout of the MTESS in a second exemplary embodiment of the present disclosure.

FIG. 2A is a simplified block diagram of an overall system layout of the MTESS 10 in a second exemplary embodiment of the present disclosure. In this embodiment, an Auxiliary Thermal Energy Source 25 is used only for applications in which the onsite Thermal Energy Source 13 cannot achieve the required storage temperatures.

Figure 2B:
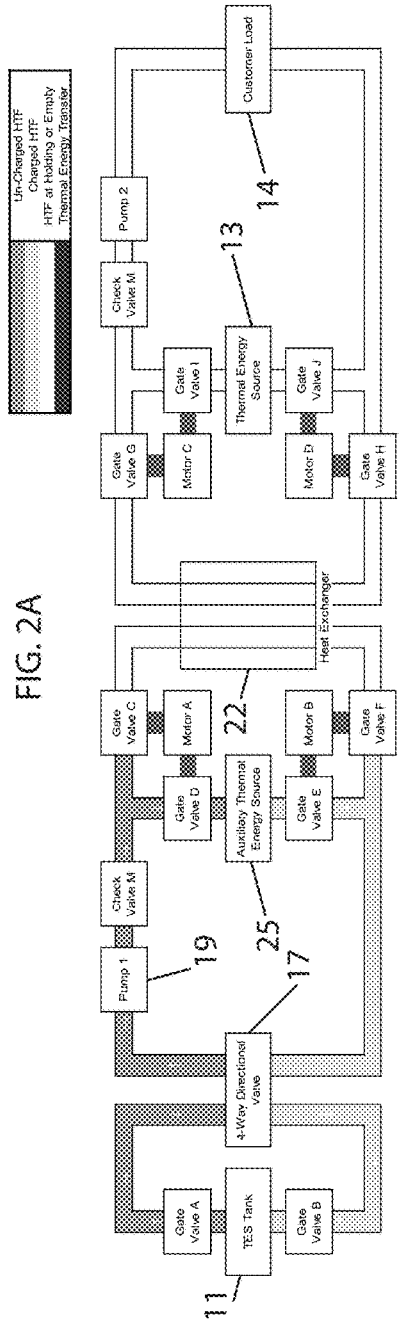
FIG. 2B is a simplified block diagram of the MTESS showing the flow of fluid in a TES Charge Only mode in the embodiment of FIG. 2A.

FIG. 2B is a simplified block diagram of the MTESS 10 showing the flow of fluid in a TES Charge Only mode in the embodiment of FIG. 2A. The TES Charge Only mode represents a scenario in which the Auxiliary Thermal Energy Source 25 provides thermal energy conversion for the HTF being used to transfer thermal energy to the MTESS. Here the charged HTF exits the Auxiliary Thermal Energy Source 25 and passes through the 4-Way Directional Valve 17 to the TES tank 11 to be stored for later use. The HTF that initially contained the thermal energy is now recirculated back to the Auxiliary Thermal Energy Source 25 provided by the MTESS. This process continues until the proper storage temperatures are reached at which time the EMS within the control unit sends a signal to the pumps and heat exchangers and corresponding valves to deactivate, or close, to complete the cycle. The fluid that exits the TES tank after it has transferred its stored thermal energy to the thermal energy materials being used in this scenario, is then recirculated back to the heat exchanger 22 via Pump-1 19 to be recharged by the Auxiliary Thermal Energy Source 25.

Figure 2C:
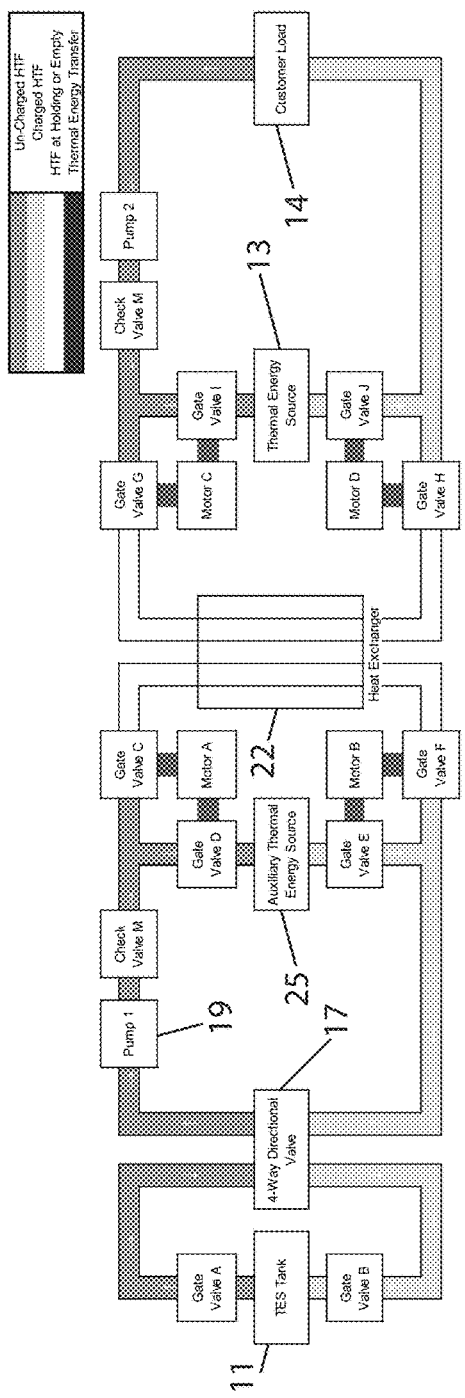
FIG. 2C is a simplified block diagram of the MTESS showing the flow of fluid in a TES Charge, Source Supply and Load Draw mode in the embodiment of FIG. 2A.

FIG. 2C is a simplified block diagram of the MTESS 10 showing the flow of fluid in a TES Charge, Source Supply and Load Draw mode in the embodiment of FIG. 2A. The TES Charge and Load Draw mode represents a scenario in which the TES tank 11 is being charged by the Auxiliary Thermal Energy Source 25 provided in the MTESS as in FIG. 2B, while the Auxiliary Thermal Energy Source is also being used by the customer during normal operating hours.

Figure 2D:
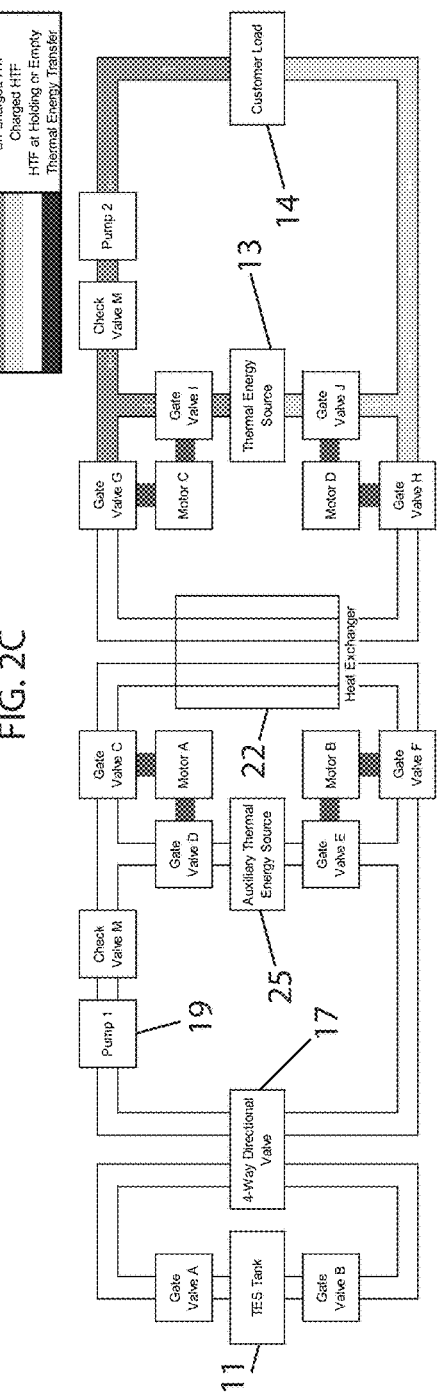
FIG. 2D is a simplified block diagram of the MTESS showing the flow of fluid in a Source Supply and Load Draw Only mode in the embodiment of FIG. 2A.

FIG. 2D is a simplified block diagram of the MTESS 10 showing the flow of fluid in a Source Supply and Load Draw Only mode in the embodiment of FIG. 2A. The Load Draw Only mode represents a scenario in which the TES tank 11 is in a holding mode usually seen at the end of TES Charge Only mode or TES Charge, Source Supply and Load Draw mode. In this scenario, the thermal energy that has been transferred to the TES tank is waiting to be utilized by the customer. During this time, the customer may be providing its own needs as seen appropriate for the intended use. This scenario may occur regularly after the TES tank 11 has completed its charging cycle.

Figure 2E:
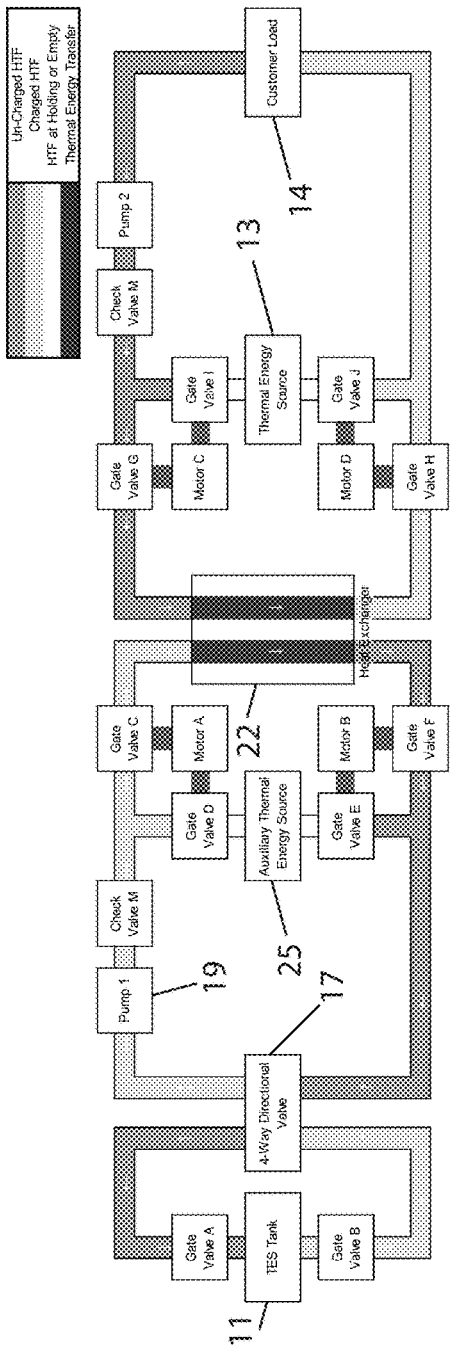
FIG. 2E is a simplified block diagram of the MTESS showing the flow of fluid in a TES Discharge, Source Off and Load Draw (Full Storage) mode in the embodiment of FIG. 2A.

FIG. 2E is a simplified block diagram of the MTESS 10 showing the flow of fluid in a TES Discharge, Source Off and Load Draw (Full Storage) mode in the embodiment of FIG. 2A. The TES Discharge, Source Off and Load Draw (Full Storage) mode represents a scenario in which the customer is drawing out the thermal energy stored by the TES tank 11. Here the thermal energy stored in the thermal energy storage materials in the TES tank is drawn out of those materials by passing a non-charged HTF through the TES tank, and exiting the TES tank with a charged HTF, which is then routed back to the heat exchanger 22 via Pump-1 19. The thermal energy is then transferred to the HTF used in the customer-provided Thermal Energy Source and sent to the customer through the second 4-way directional valve via Pump-2 21. Non-charged HTF from the customer load 14 is then recirculated back to the heat exchanger 22 in the control unit 12 of the MTESS, to be used to transfer the stored thermal energy back to the customer.

Figure 2F:
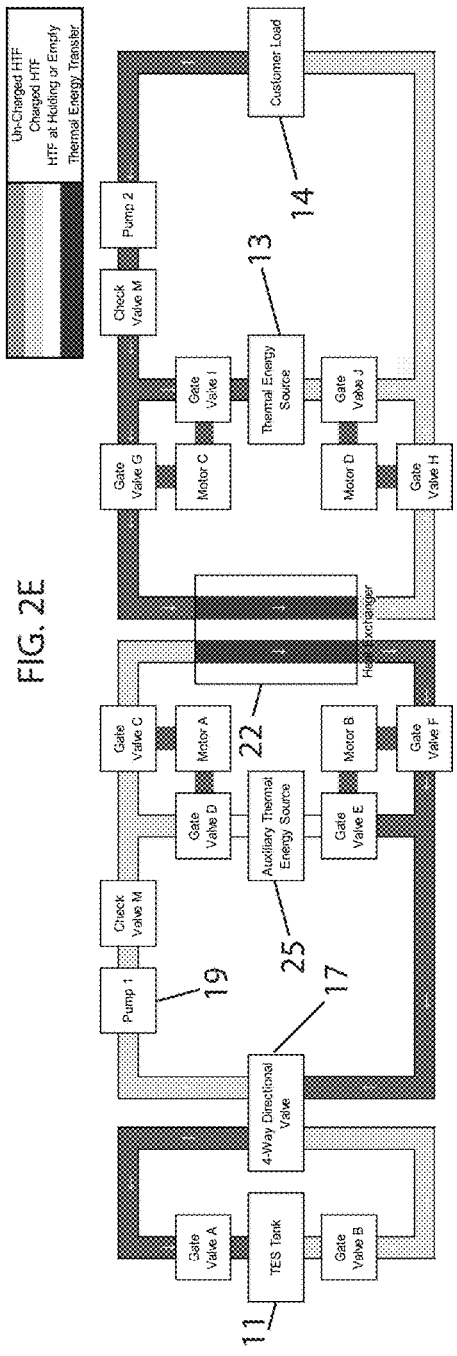
FIG. 2F is a simplified block diagram of the MTESS showing the flow of fluid in a TES Discharge, Source Supply and Load Draw (Partial Storage) mode in the embodiment of FIG. 2A.

FIG. 2F is a simplified block diagram of the MTESS 10 showing the flow of fluid in a TES Discharge, Source Supply and Load Draw (Partial Storage) mode in the embodiment of FIG. 2A. The TES Discharge, Source Supply and Load Draw (Partial Storage) mode represents a scenario in which the thermal energy stored in the TES tank 11 is supplied back to the customer load 14 in the same manner as described in the TES Charge Only mode, but in addition to the thermal energy stored in the TES tank being provided back to the customer load as described in the Full Storage Mode (FIG. 2E), the customer is also creating a supplemental supply of thermal energy back to the load.

Different Storage Temperatures

The versatility of the MTESS is predicated on the ability of the system to both store and transport thermal energy across the two major TES spectrums: low-temperature storage and high-temperature storage. The MTESS accomplishes this by utilizing standardized storage containers, insulation, and piping systems while changing the HTF and thermal energy storage materials in the TES tank 11 based on the target storage temperature (determined by the application). In different embodiments, the TES tank may be used for low-temperature or high-temperature storage applications.

Figure 3A:
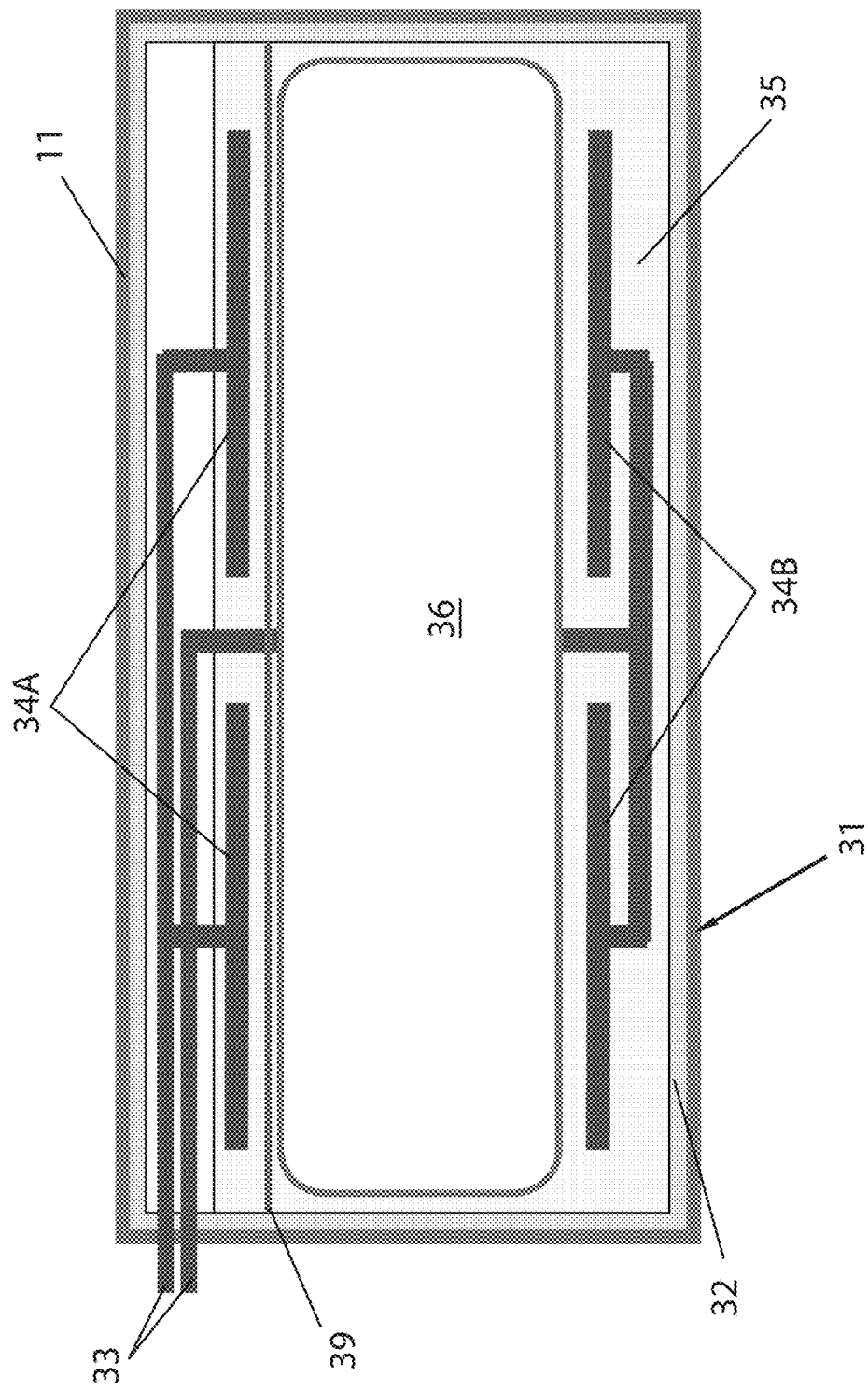
FIG. 3A is a sectional side view of a first exemplary embodiment of a Thermal Energy Storage (TES) tank.

FIG. 3A is a sectional side view of a first exemplary embodiment of the TES tank 11 directed toward low-temperature storage applications. The low-temperature storage spectrum includes refrigeration applications, space cooling (e.g., air conditioning) applications, and temperature regulation/low-temperature process heat applications. Refrigeration systems are mainly used in commercial industry applications such as grocery stores or food-processing facilities. The MTESS provides consumers utilizing refrigeration systems with energy savings primarily in the form of peak demand shaving. Here the principal of peak demand shaving is applied to provide the end-user with supplemental refrigeration as well as relief from peak demand pricing from their electrical grid supplier.

The TES tank 11 may be implemented in a standardized container (e.g., shipping container) 31. The interior surface of the container is covered with insulation 32. Thermal energy enters and exits the TES tank through input/output piping 33. Upper and lower diffuser pipes 34a and 34b are immersed in HTF 35 and surround thermal energy storage materials 36, as selected dependent upon the intended customer application. A storage material grate 37 retains the thermal energy storage materials. The thermal energy storage materials utilized in low-temperature storage applications often float inside the HTF 35, and thus the storage material grate must be mounted just below the upper diffuser pipes 34a in order to ensure the thermal energy storage materials 36 remain fully submerged at all times and prevent them from contacting the upper diffuser pipes.

The thermal energy storage materials 36 may be applied to the system using a "packed-bed" method to maximize the storage density and simplify the design for manufacturability. The insulation 32 and piping systems 33, 34 may be mounted inside the standardized container 31 as shown. These components remain constant regardless of the storage temperature or application. The insulation used in this common form factor may be layered as follows: (1) the outside of the container; (2) then a rubberized liner sprayed on the inner surface of the container; (3) then a cost-efficient insulation material, such as Mineral Wool, held in place using insulation-mounting bracketry that doubles as a mounting device for (4) a liner that separates the insulation materials from the HTF used. Due to the natural stratification of temperature gradients in a fluid body (such as the HTF in the storage tank), the upper diffuser pipes 34a always handle the higher temperature HTF and represent the relative high-temperature side of the system. The lower diffuser pipes 34b always handle the lower temperature HTF and represent the relative low-temperature side of the system. This thermal gradient also produces a thermocline, which insulates the majority of the thermal energy being stored within the container from its opposite temperature side.

For refrigeration applications, the desired storage temperature may be between approximately −30° F. and +40° F. Here the primary thermal energy storage materials 36 may be different types of organic paraffin wax (for example, sourced from recycled oil and gas waste streams). These paraffin waxes may be sealed in specialized capsules to prevent mixing with the HTF 35, and to allow for volume expansion during phase change from liquid to a solid (desired storage temperatures determines which type of paraffin wax is used). Secondarily, a catalyst or eutectic solution may be added to the encapsulated materials to increase density of storage and/or increase the rate at which the materials reach the target storage temperature/change phase. A standard coolant, such as 50/50 glycol/water solution, may be used as the HTF 35 for refrigeration applications.

Space cooling systems are mainly used for commercial, industrial, and municipal cooling applications. Here the principal of peak demand shaving is applied to provide the end-user with supplemental cooling as well as relief from peak demand pricing from their electrical grid supplier. For space cooling applications, the desired storage temperature may be approximately +32° F.+/−a few degrees (e.g., +/−5° F.) for variation. Here the primary thermal energy storage material 36 may be water, which has a thermal conductivity of 1.28 Btu/(ft h ° F.) and a specific heat of 0.49 btu/lb*f. The storage material may be sealed in specialized capsules to prevent mixing with the HTF 35 and to allow for volume expansion during phase change from liquid to a solid. Secondarily, a catalyst or eutectic solution may be added to the encapsulated materials to increase density of storage and/or increase the rate at which the materials reach the target storage temperature/change phase. A standard coolant, such as 30/70 glycol/water solution, may be used as the HTF 35 for space cooling applications.

Temperature regulation/low-temperature process heat systems are mainly used for commercial/industrial applications. The MTESS provides consumers utilizing temperature regulation systems or low-temperature process heat applications with energy savings primarily in the form of peak demand shaving. Here the principal of peak demand shaving is applied to provide the end-user with supplemental temperature regulation/low-temperature process heat as well as relief from peak demand pricing from their grid supplier. For these applications, the desired storage temperature may be between approximately +40° F. and +200° F. Here the primary thermal energy storage materials 36 may be different types of organic paraffin wax. These paraffin waxes may be sealed in specialized capsules to prevent mixing with the HTF and to allow for volume expansion during phase change from liquid to a solid (desired storage temperatures determines which type of paraffin wax is used). Secondarily, a catalyst or eutectic solution may be added to the encapsulated materials to increase density of storage and/or increase the rate at which the materials reach the target storage temperature/change phase. Standard filtered water may be used as the HTF 35 for temperature regulation systems or low-temperature process heat applications.

Figure 3B:
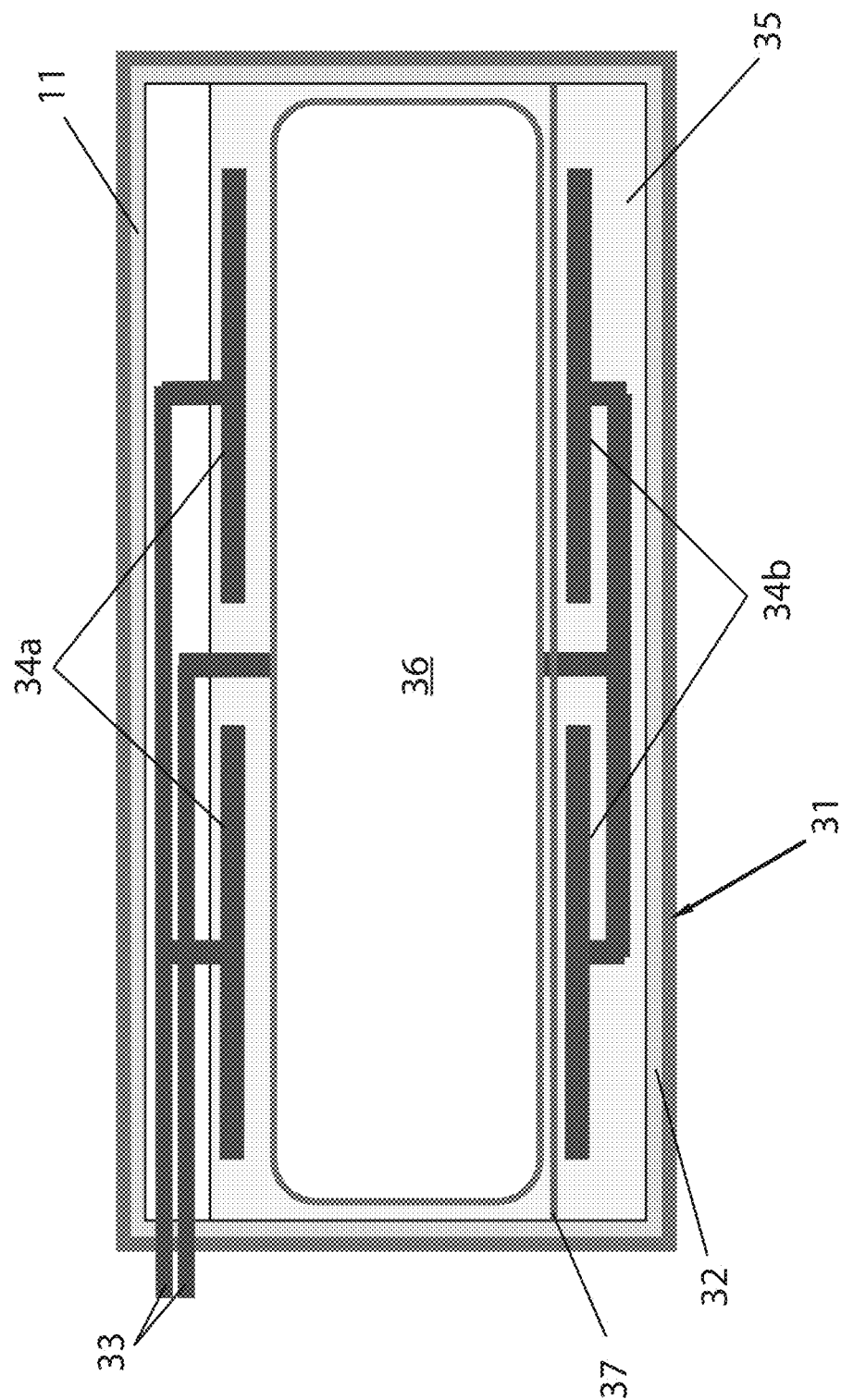
FIG. 3B is a sectional side view of a second exemplary embodiment of a TES tank.

FIG. 3B is a sectional side view of a second exemplary embodiment of a TES tank 11 directed toward high-temperature storage applications. The high-temperature storage spectrum includes high-temperature process heat applications and heat-to-power on-demand power production applications. For both high-temperature spectrum applications, the principal of peak demand shaving is applied to provide the end-user with supplemental high-temperature process heat, on demand power production, and relief from peak demand pricing from their grid supplier. The desired storage temperatures may be greater than +200° F. Here the primary thermal energy storage materials 36 being used may be solid rock and sand particles, which will not change phase, but simply store thermal energy directly as sensible energy (desired storage temperatures determine which type of rock or sand is used). A standard high-temperature oil, such as motor oil, may be used as the HTF 35 for high-temperature spectrum applications. The thermal energy storage materials utilized in high-temperature storage applications often sink inside the HTF 35, and thus the storage material grate 37 must be mounted just above the lower diffuser pipes 34b in order to prevent the thermal energy storage materials from contacting the lower diffuser pipes.

Once the application is defined and the thermal energy storage materials are determined, the TES tank 11 can be easily manufactured, transported, installed, and scaled according to variable application requirements.

Figure 4:
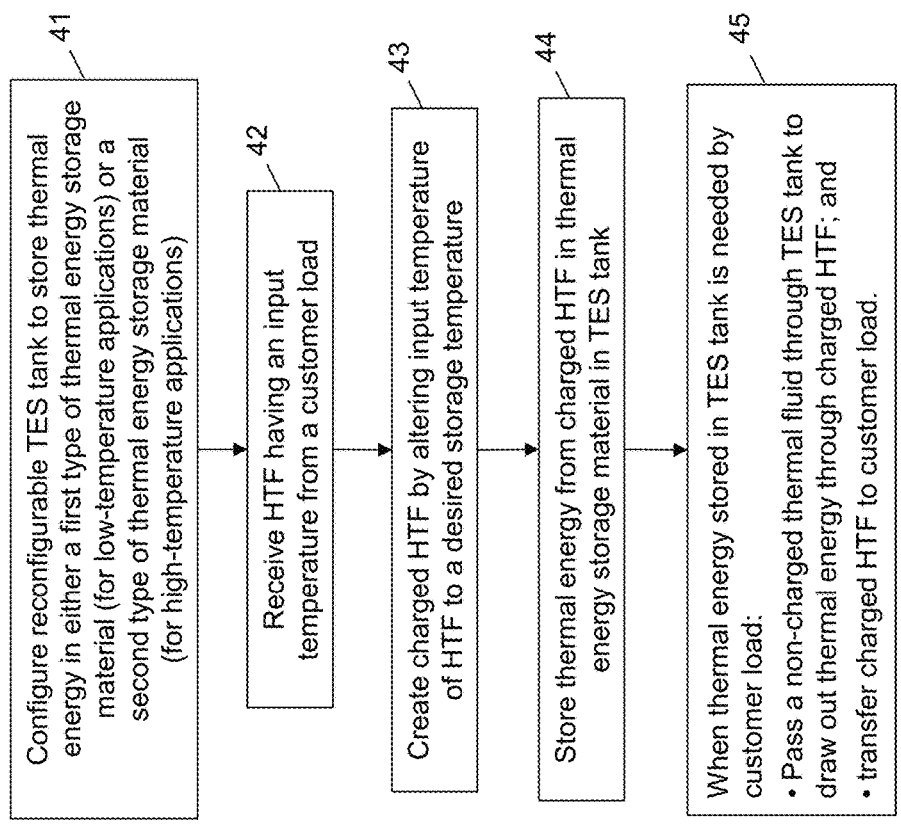
FIG. 4 is a flow chart illustrating the steps of an exemplary embodiment of a method in the MTESS for storing and transferring thermal energy at a wide range of temperatures.

FIG. 4 is a flow chart illustrating the steps of an exemplary embodiment of a method in the MTESS 10 for storing and transferring thermal energy at a wide range of temperatures. At step 41, a reconfigurable TES tank is configured to store thermal energy in either a first type of thermal energy storage material that stores low-temperature thermal energy for applications requiring storage temperatures in an exemplary range of −30° F. to +200° F., or a second type of thermal energy storage material that stores high-temperature thermal energy for applications requiring storage temperatures, for example, in excess of +200° F. At step 42, the MTESS receives from a customer load 14, HTF having an input temperature. At step 43, the MTESS creates charged HTF by altering the input temperature of the HTF to a desired storage temperature. At step 44, the MTESS stores thermal energy from the charged HTF in the thermal energy storage material 36 in the TES tank 11. At step 45, when the thermal energy stored in the TES tank is needed by the customer load 14, the MTESS passes a non-charged thermal fluid through the TES tank to draw out the thermal energy through the charged HTF, and transfers the thermal energy of the charged HTF from the thermal energy storage system to the customer load.

Figure 5:
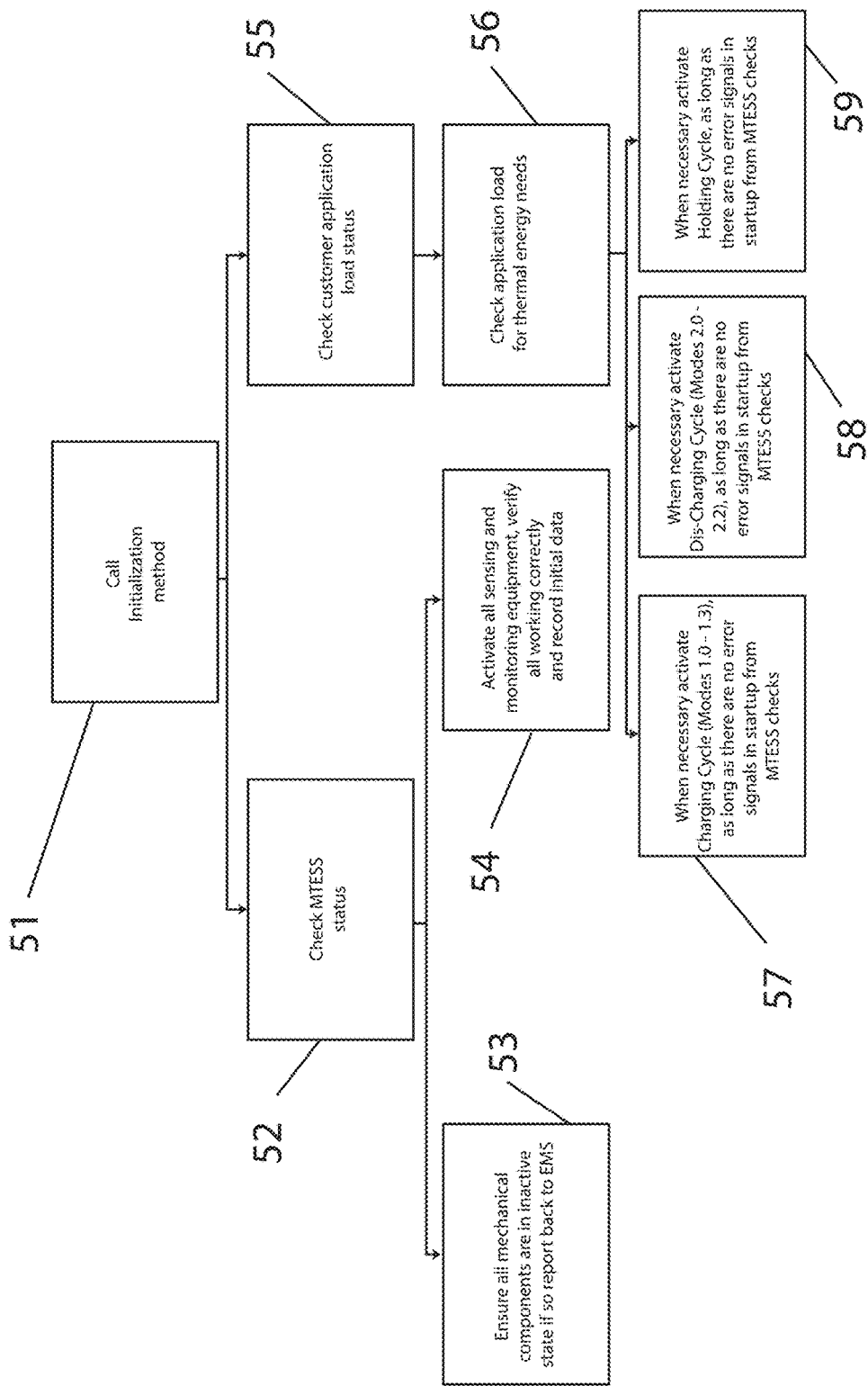
FIG. 5 is a flow chart illustrating the steps of an exemplary embodiment of an initialization method for the MTESS of the present disclosure.

FIG. 5 is a flow chart illustrating the steps of an exemplary embodiment of an initialization method for the MTESS 10 of the present disclosure. At step 51, the initialization method is called by the processor 15 executing the EMS software in the control unit 12. At step 52, the status of the MTESS is checked. At step 53, all mechanical components ensure they are in an inactive state, and if so, report to the EMS. At step 54, all sensing and monitoring equipment is activated, correct operation is verified, and initial data is recorded. At step 55, the customer application load status is checked. At step 56, the customer application load is checked for thermal energy needs. At step 57, when necessary, the Charging Cycle (FIGS. 1B-1D) is activated as long as there are no error signals generated in steps 52-54. At step 58, when necessary, the Discharging Cycle (FIGS. 2B-2D) is activated as long as there are no error signals generated in steps 52-54. At step 59, when necessary, a Holding Cycle is activated as long as there are no error signals generated in steps 52-54.

Figure 6A:
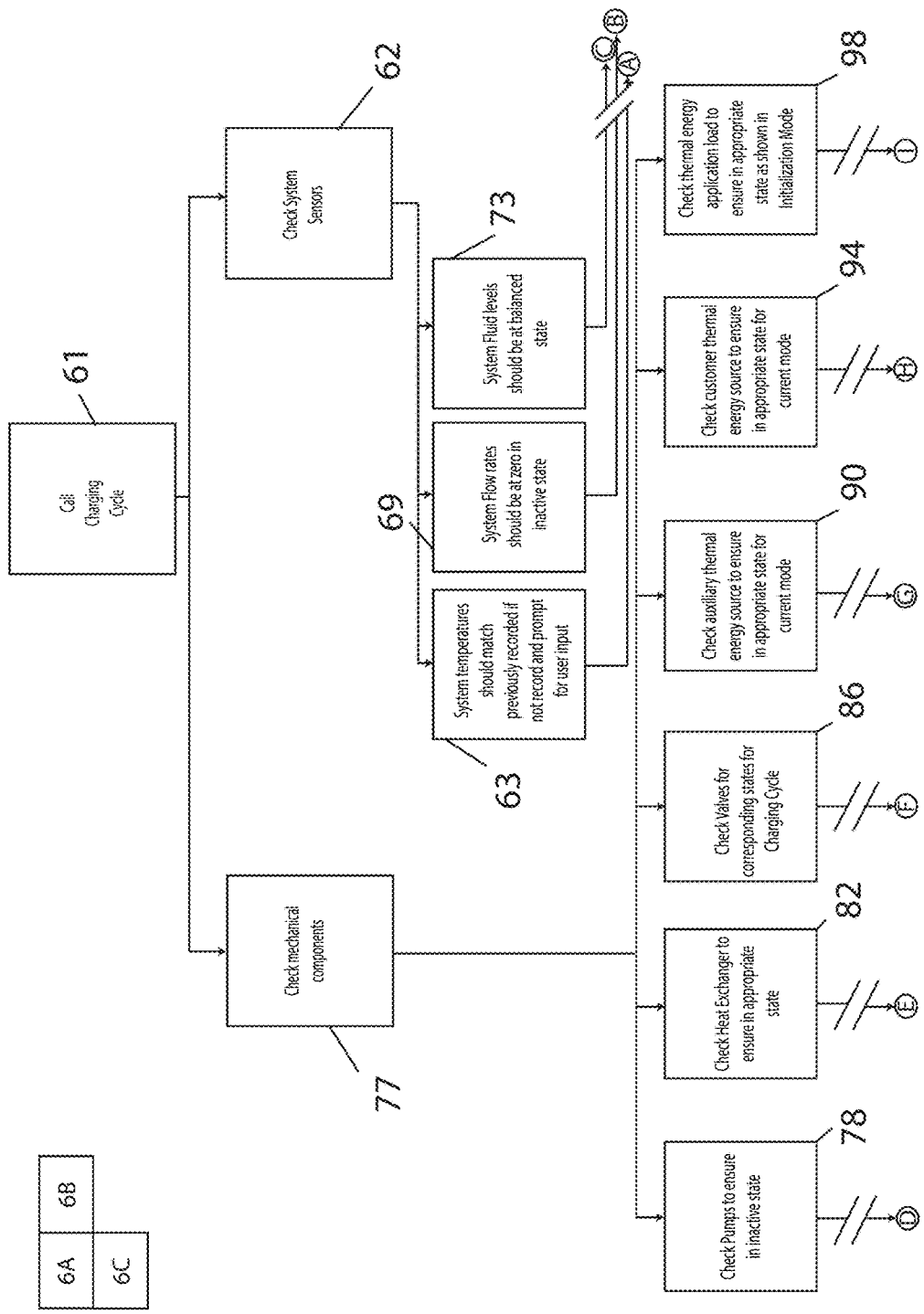
FIGS. 6A-6C are portions of a flow chart illustrating the steps of an exemplary embodiment of a method for charging the MTESS of the present disclosure.
Figure 6B:
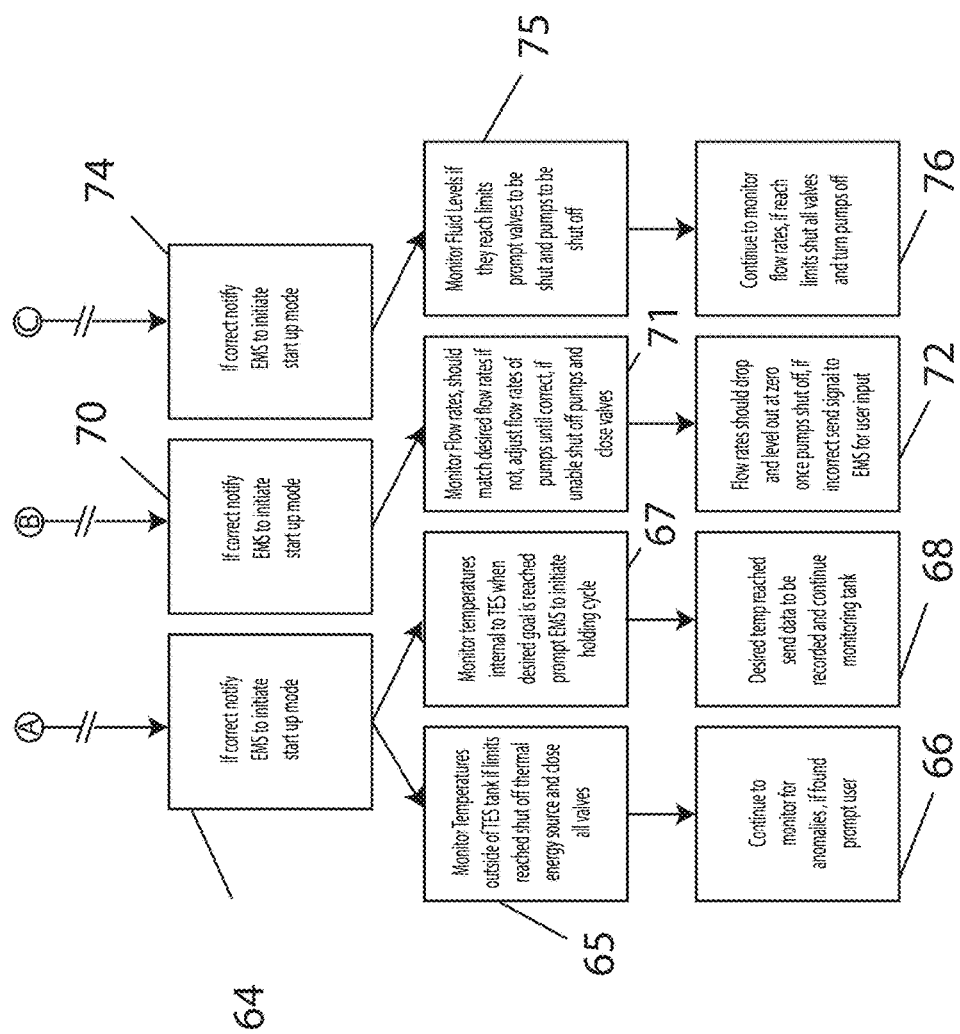
Figure 6C:
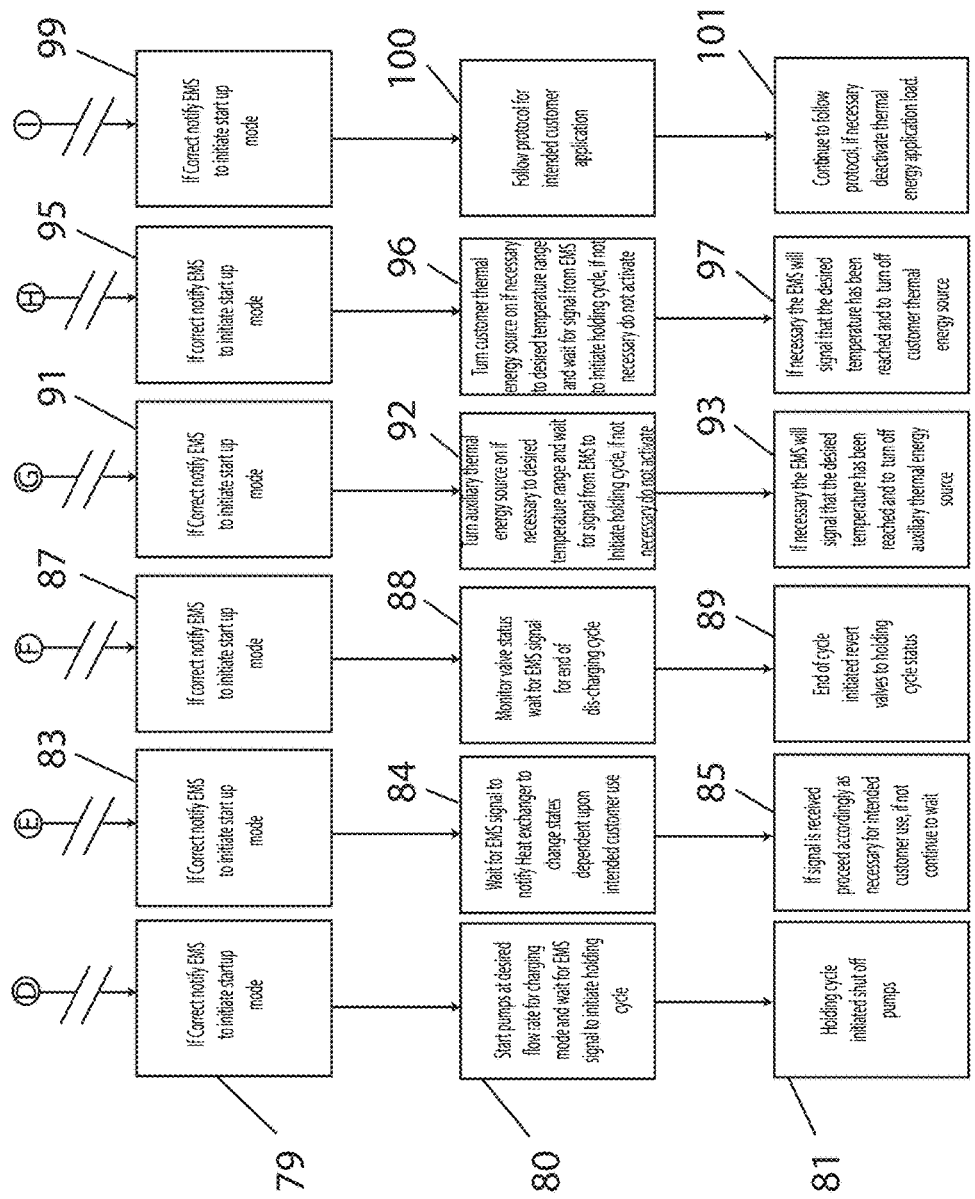

FIGS. 6A-6C are portions of a flow chart illustrating the steps of an exemplary embodiment of a method for charging the MTESS 10 of the present disclosure. Referring to FIG. 6A, at step 61, the charging cycle is called by the processor 15 executing the EMS software in the control unit 12. At step 62, the status of the MTESS is checked. At step 63, system temperatures are checked and should match those previously recorded. If they do not, the temperatures are recorded and user input is prompted. The method then proceeds to step 64 on FIG. 6B, where if the temperatures are correct, the EMS is notified to initiate a startup mode. At step 65, temperatures outside of the TES tank are monitored. If predefined limits are reached, the system shuts off the Thermal Energy Source 13 and closes all valves. At step 66 the system continues to monitor for anomalies, and if found, user input is prompted. At step 67, temperatures internal to the TES tank are monitored. When the desired goal is reached, the EMS is prompted to initiate the holding cycle. At step 68, when a desired temperature is reached the system sends data to be recorded and continues monitoring the TES tank.

Referring again to FIG. 6A, at step 69, system flow rates are checked. The flow rates should be zero in the inactive state. The method then proceeds to step 70 on FIG. 6B, where if the flow rates are correct, the EMS is notified to initiate the startup mode. At step 71, the flow rates are monitored and should match desired flow rates. If not, the system adjusts the flow rates of the pumps until the flow rates are correct. If unable to achieve correct flow rates, the system shuts off the pumps and closes the valves. At step 72, given that the pumps have been shut off and the valves closed, flow rates should drop and level out at zero. If they do not, a signal is sent to the EMS for user input.

Referring again to FIG. 6A, at step 73, system fluid levels are checked and should be in a balanced state. The method then proceeds to step 74 on FIG. 6B, where if the fluid levels are correct, the EMS is notified to initiate the startup mode. At step 75, the fluid levels are monitored and if they reach threshold limits, the system prompts valves to close and pumps to shut off. At step 76 the system continues to monitor the flow rates and if they reach limits, all valves are closed and the pumps are shut off.

Referring again to FIG. 6A, at step 77, mechanical components are checked. At step 78, pumps are checked to ensure they are in the inactive state. The method then proceeds to step 79 on FIG. 6C, where if the pumps are correctly in the inactive state, the EMS is notified to initiate the startup mode. At step 80, the system starts the pumps at the desired flow rate for the charging mode and waits for the EMS signal to initiate the holding cycle. At step 81, the holding cycle is initiated and the pumps are shut off.

Referring again to FIG. 6A, at step 82, the heat exchanger is checked to ensure it is in the appropriate state. The method then proceeds to step 83 on FIG. 6C, where if the heat exchanger is correctly in the appropriate state, the EMS is notified to initiate the startup mode. At step 84, the system waits for an EMS signal to notify the heat exchanger to change states, dependent upon the intended customer use. At step 85, if the EMS signal is received, the system proceeds as necessary for the intended customer use. If the signal is not received, the system continues to wait for the EMS signal.

Referring again to FIG. 6A, at step 86, the valves are checked to ensure they are in the correct corresponding states for the charging cycle. The method then proceeds to step 87 on FIG. 6C, where if the valves are in the correct states, the EMS is notified to initiate the startup mode. At step 88, the system monitors valve status and waits for an EMS signal for the end of the charging cycle. At step 89, when the end of the charging cycle is initiated, the system reverts the valves to their holding cycle status.

Referring again to FIG. 6A, at step 90, the Auxiliary Thermal Energy Source is checked to ensure it is in the appropriate state for the current mode. The method then proceeds to step 91 on FIG. 6C, where if the Auxiliary Thermal Energy Source is in the correct state, the EMS is notified to initiate the startup mode. At step 92, the system turns on the Auxiliary Thermal Energy Source if necessary to achieve the desired temperature range. The system waits for a signal from the EMS to initiate the holding cycle. If it is not necessary to utilize The Auxiliary Thermal Energy Source, it is not activated. At step 93, if necessary to activate the Auxiliary Thermal Energy Source, the EMS signals that the desired temperature has been reached and to turn off the Auxiliary Thermal Energy Source.

Referring again to FIG. 6A, at step 94, the customer Thermal Energy Source is checked to ensure it is in the appropriate state for the current mode. The method then proceeds to step 95 on FIG. 6C, where if the customer Thermal Energy Source is in the correct state, the EMS is notified to initiate the startup mode. At step 96, the system turns on the customer Thermal Energy Source if necessary to achieve the desired temperature range. The system waits for a signal from the EMS to initiate the holding cycle. If it is not necessary to utilize the customer Thermal Energy Source, it is not activated. At step 97, if necessary to activate the customer Thermal Energy Source, the EMS signals that the desired temperature has been reached and to turn off the customer Thermal Energy Source.

Referring again to FIG. 6A, at step 98, the thermal energy application load is checked to ensure it is in the appropriate state as shown in the initialization mode. The method then proceeds to step 99 on FIG. 6C, where if the thermal energy application load is in the correct state, the EMS is notified to initiate the startup mode. At step 100, the system follows the appropriate protocol for the intended customer application. At step 101, the system continues to follow the appropriate protocol and if necessary, deactivates the thermal energy application load.

Figure 7A:
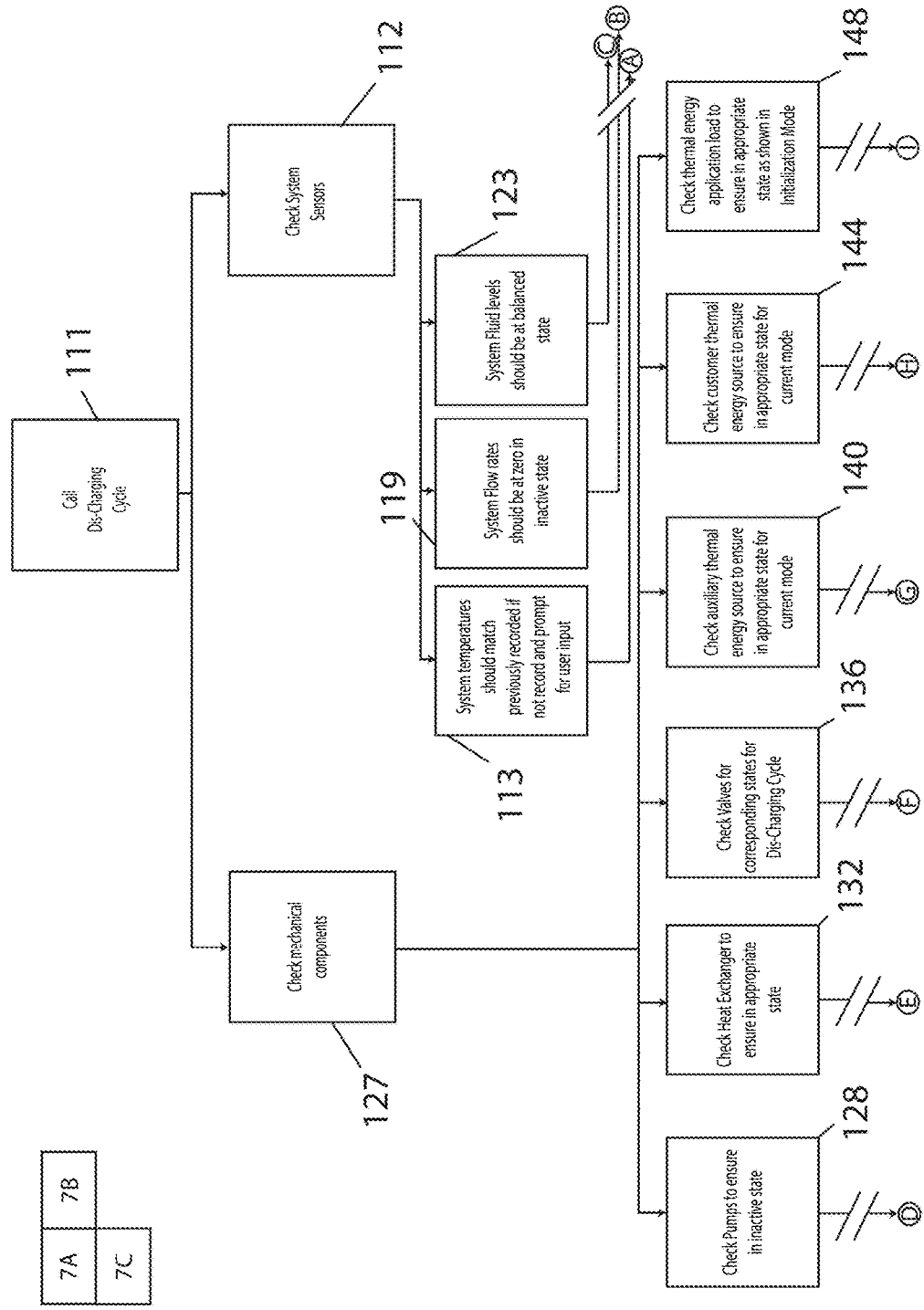
FIGS. 7A-7C are portions of a flow chart illustrating the steps of an exemplary embodiment of a method for discharging the MTESS of the present disclosure.
Figure 7B:
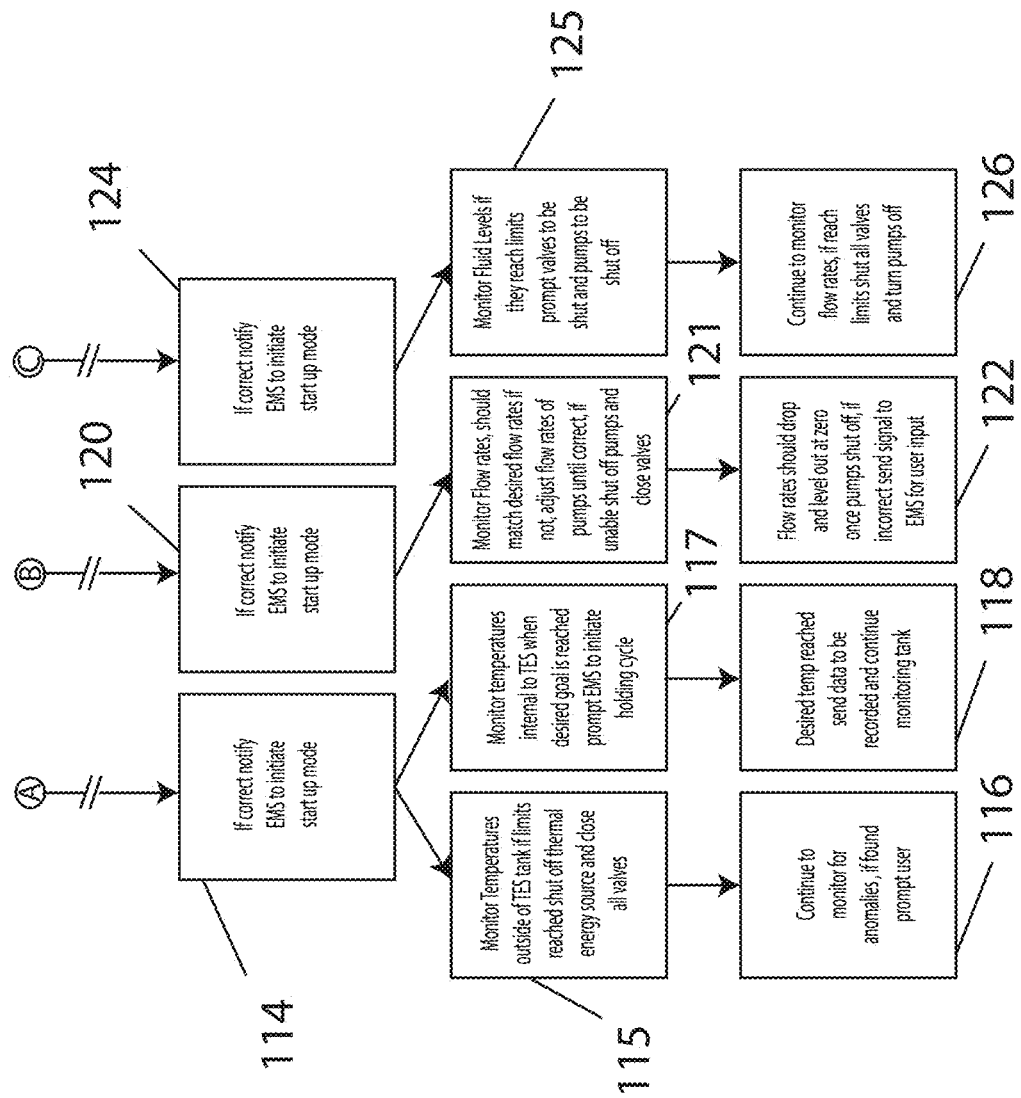
Figure 7C:
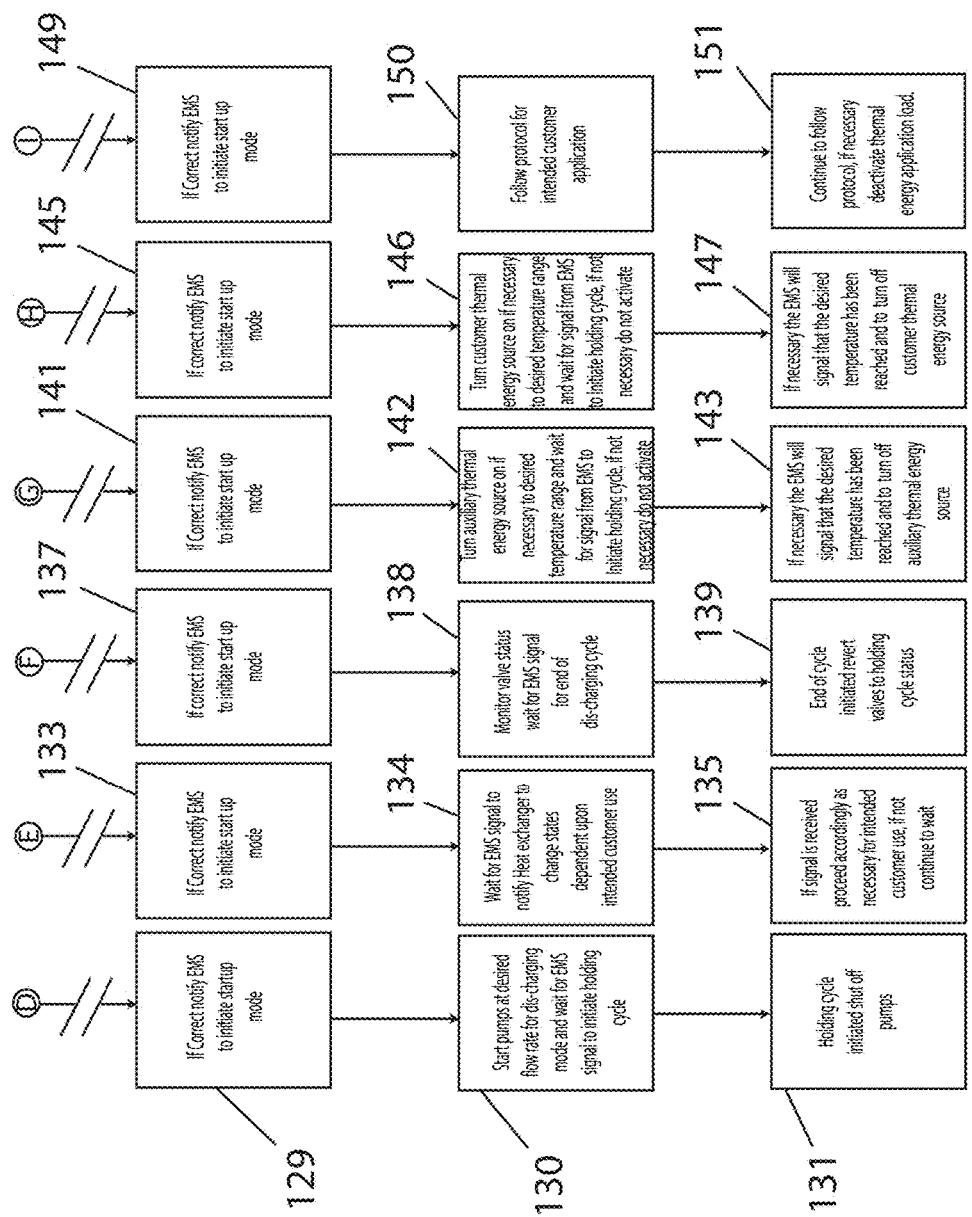

FIGS. 7A-7C are portions of a flow chart illustrating the steps of an exemplary embodiment of a method for discharging the MTESS 10 of the present disclosure. Referring to FIG. 7A, at step 111, the discharging cycle is called by the processor 15 executing the EMS software in the control unit 12. At step 112, the status of the MTESS is checked. At step 113, system temperatures are checked and should match those previously recorded. If they do not, the temperatures are recorded and user input is prompted. The method then proceeds to step 114 on FIG. 7B, where if the temperatures are correct, the EMS is notified to initiate a startup mode. At step 115, temperatures outside of the TES tank are monitored. If predefined limits are reached, the system shuts off the Thermal Energy Source 13 and closes all valves. At step 116 the system continues to monitor for anomalies, and if found, prompts for user input. At step 117, temperatures internal to the TES tank are monitored. When the desired goal is reached, the EMS is prompted to initiate the holding cycle. At step 118, when a desired temperature is reached the system sends data to be recorded and continues monitoring the TES tank.

Referring again to FIG. 7A, at step 119, system flow rates are checked. The flow rates should be zero in the inactive state. The method then proceeds to step 120 on FIG. 7B, where if the flow rates are correct, the EMS is notified to initiate the startup mode. At step 121, the flow rates are monitored and should match desired flow rates. If not, the system adjusts the flow rates of the pumps until the flow rates are correct. If unable to achieve correct flow rates, the system shuts off the pumps and closes the valves. At step 122, given that the pumps have been shut off and the valves closed, flow rates should drop and level out at zero. If they do not, a signal is sent to the EMS for user input.

Referring again to FIG. 7A, at step 123, system fluid levels are checked and should be in a balanced state. The method then proceeds to step 124 on FIG. 7B, where if the fluid levels are correct, the EMS is notified to initiate the startup mode. At step 125, the fluid levels are monitored and if they reach threshold limits, the system prompts valves to close and pumps to shut off. At step 126 the system continues to monitor the flow rates and if they reach limits, all valves are closed and the pumps are shut off.

Referring again to FIG. 7A, at step 127, mechanical components are checked. At step 128, pumps are checked to ensure they are in the inactive state. The method then proceeds to step 129 on FIG. 7C, where if the pumps are correctly in the inactive state, the EMS is notified to initiate the startup mode. At step 130, the system starts the pumps at the desired flow rate for the discharging mode and waits for the EMS signal to initiate the holding cycle. At step 131, the holding cycle is initiated and the pumps are shut off.

Referring again to FIG. 7A, at step 132, the heat exchanger is checked to ensure it is in the appropriate state. The method then proceeds to step 133 on FIG. 7C, where if the heat exchanger is correctly in the appropriate state, the EMS is notified to initiate the startup mode. At step 134, the system waits for an EMS signal to notify the heat exchanger to change states, dependent upon the intended customer use. At step 135, if the EMS signal is received, the system proceeds as necessary for the intended customer use. If the signal is not received, the system continues to wait for the EMS signal.

Referring again to FIG. 7A, at step 136, the valves are checked to ensure they are in the correct corresponding states for the discharging cycle. The method then proceeds to step 137 on FIG. 7C, where if the valves are in the correct states, the EMS is notified to initiate the startup mode. At step 138, the system monitors valve status and waits for an EMS signal for the end of the discharging cycle. At step 139, when the end of the discharging cycle is initiated, the system reverts the valves to their holding cycle status.

Referring again to FIG. 7A, at step 140, the Auxiliary Thermal Energy Source is checked to ensure it is in the appropriate state for the current mode. The method then proceeds to step 141 on FIG. 7C, where if the Auxiliary Thermal Energy Source is in the correct state, the EMS is notified to initiate the startup mode. At step 142, the system turns on the Auxiliary Thermal Energy Source if necessary to achieve the desired temperature range. The system waits for a signal from the EMS to initiate the holding cycle. If it is not necessary to utilize The Auxiliary Thermal Energy Source, it is not activated. At step 143, if necessary to activate the Auxiliary Thermal Energy Source, the EMS signals that the desired temperature has been reached and to turn off the Auxiliary Thermal Energy Source.

Referring again to FIG. 7A, at step 144, the customer Thermal Energy Source is checked to ensure it is in the appropriate state for the current mode. The method then proceeds to step 145 on FIG. 7C, where if the customer Thermal Energy Source is in the correct state, the EMS is notified to initiate the startup mode. At step 146, the system turns on the customer Thermal Energy Source if necessary to achieve the desired temperature range. The system waits for a signal from the EMS to initiate the holding cycle. If it is not necessary to utilize the customer Thermal Energy Source, it is not activated. At step 147, if necessary to activate the customer Thermal Energy Source, the EMS signals that the desired temperature has been reached and to turn off the customer Thermal Energy Source.

Referring again to FIG. 7A, at step 148, the thermal energy application load is checked to ensure it is in the appropriate state as shown in the initialization mode. The method then proceeds to step 149 on FIG. 7C, where if the thermal energy application load is in the correct state, the EMS is notified to initiate the startup mode. At step 150, the system follows the appropriate protocol for the intended customer application. At step 151, the system continues to follow the appropriate protocol and if necessary, deactivates the thermal energy application load.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A thermal energy storage system for storing and transferring thermal energy at a wide range of temperatures, the system comprising:
    piping, valves, and pumps required for moving heat transfer fluid (HTF) to and from a customer load and within the system;
    a thermal energy source for adding thermal energy to the HTF for high-temperature applications and for removing thermal energy from the HTF for low-temperature applications; and
    a reconfigurable thermal energy storage (TES) tank configured to store thermal energy, the TES tank comprising:
        replaceable thermal energy storage material, wherein the TES tank is configured to operate with either a first type of thermal energy storage material that stores low-temperature thermal energy for applications requiring storage temperatures in a range of −30° F. to +200° F., or a second type of thermal energy storage material that stores high-temperature thermal energy for applications requiring storage temperatures greater than +200° F.;
        HTF surrounding the thermal energy storage material for transferring thermal energy to and from the thermal energy storage material; and
        at least one diffuser pipe disposed within the HTF and connected to input/output pipes for moving the HTF into and out of the TES tank during charging and discharging phases, respectively, of the system.

2. The thermal energy storage system according to claim 1, wherein the system is modular and transportable, and is implemented in insulated shipping containers.

3. The thermal energy storage system according to claim 2, further comprising a second TES tank configured for interconnection with the TES tank to increase thermal energy storage capacity for different customer loads.

4. The thermal energy storage system according to claim 3, wherein the piping, valves, and pumps are mounted in the shipping containers in a configuration corresponding to the thermal energy storage capacity of the TES tanks.

5. The thermal energy storage system according to claim 1, wherein the type of replaceable thermal energy storage material and the type of HTF utilized in the TES tank are selected dependent upon an intended customer application.

6. The thermal energy storage system according to claim 5, wherein for low-temperature refrigeration applications where a desired storage temperature is in a range of approximately −30° F. to +40° F.:
    the type of replaceable thermal energy storage material is a packed bed of organic paraffin wax sealed in capsules to prevent mixing with the HTF and to allow for volume expansion during phase change from liquid to a solid; and
    the HTF is a 50/50 glycol/water solution.

7. The thermal energy storage system according to claim 6, wherein a catalyst or eutectic solution is added to the encapsulated materials to increase density of storage or to increase a rate at which the materials reach a target storage temperature.

8. The thermal energy storage system according to claim 5, wherein for low-temperature space cooling applications where a desired storage temperature is in a range of approximately +27° F. to +37° F.:
    the type of replaceable thermal energy storage material is a packed bed of water sealed in capsules to prevent mixing with the HTF and to allow for volume expansion during phase change from liquid to a solid; and
    the HTF is a 30/70 glycol/water solution.

9. The thermal energy storage system according to claim 5, wherein for temperature regulation systems and low-temperature process heat applications where a desired storage temperature is in a range of approximately +40° F. to +200° F.:
    the type of replaceable thermal energy storage material is a packed bed of organic paraffin wax sealed in capsules to prevent mixing with the HTF and to allow for volume expansion during phase change from liquid to a solid; and
    the HTF is water.

10. The thermal energy storage system according to claim 5, wherein for high-temperature process heat applications and heat-to-power on-demand power production applications where a desired storage temperature is greater than +200° F.:
    the first type of replaceable thermal energy storage material is a packed bed of solid rock or sand particles; and
    the HTF is high-temperature oil.

11. The thermal energy storage system according to claim 1, further comprising:
    processing circuitry; and
    a non-transitory memory that stores Energy Management Software (EMS) instructions;
    wherein when the processing circuitry executes the EMS instructions, the processing circuitry controls the valves and pumps to move the HTF through the piping so as to meet the thermal energy storage requirements of varying customer applications.

12. The thermal energy storage system according to claim 1, further comprising:
    an auxiliary thermal energy source for adding additional thermal energy to the HTF for high-temperature applications and for removing additional thermal energy from the HTF for low-temperature applications when the Thermal Energy Source cannot achieve storage temperatures required for a customer application.

13. The thermal energy storage system according to claim 1, wherein the thermal energy source is in a first thermal energy transfer loop, and the TES tank is in a second thermal energy transfer loop, and the system further comprises a heat exchanger for transferring thermal energy between the first thermal energy transfer loop and the second thermal energy transfer loop.

14. A method in a thermal energy storage system for storing and transferring thermal energy at a wide range of temperatures, the method comprising:
configuring a reconfigurable thermal energy storage (TES) tank to store thermal energy in either a first type of thermal energy storage material that stores low-temperature thermal energy for applications requiring storage temperatures in a range of −30° F. to +200° F., or a second type of thermal energy storage material that stores high-temperature thermal energy for applications requiring storage temperatures greater than +200° F.;
receiving from a customer load, heat transfer fluid (HTF) having an input temperature;
altering the input temperature of the HTF by a thermal energy source to a desired storage temperature, thereby creating charged HTF;
storing thermal energy from the charged HTF in the thermal energy storage material in the TES tank; and
when the thermal energy stored in the TES tank is needed by the customer load:
passing a non-charged thermal fluid through the TES tank to draw out the stored thermal energy and produce charged HTF; and
transferring the stored thermal energy through the charged HTF from the thermal energy storage system to the customer load.

15. The method according to claim 14, wherein the customer load and the thermal energy source are in a first thermal energy transfer loop, and the TES tank is in a second thermal energy transfer loop, and the step of transferring the stored thermal energy through the charged HTF from the thermal energy storage system to the customer load includes passing the charged HTF from the TES tank through a heat exchanger to transfer thermal energy from the second thermal energy transfer loop to the first thermal energy transfer loop.

16. The method according to claim 14, wherein the step of altering the input temperature of the HTF includes adding thermal energy to the HTF for high-temperature applications and removing thermal energy from the HTF for low-temperature applications by a Thermal Energy Source.

17. The method according to claim 16, wherein when the Thermal Energy Source cannot achieve storage temperatures required for a customer application, the method further comprises utilizing an auxiliary thermal energy source to add additional thermal energy to the HTF for high-temperature applications and to remove additional thermal energy from the HTF for low-temperature applications.

18. The method according to claim 14, wherein for low-temperature refrigeration applications where a desired storage temperature is in a range of approximately −30° F. to +40° F.:
the step of storing thermal energy from the charged HTF in the thermal energy storage material includes storing the thermal energy in a packed bed of organic paraffin wax sealed in capsules to prevent mixing with the charged HTF and to allow for volume expansion during phase change from liquid to a solid; and
the charged HTF is a 50/50 glycol/water solution.

19. The method according to claim 14, wherein for low-temperature space cooling applications where a desired storage temperature is in a range of approximately +27° F. to +37° F.:

the step of storing thermal energy from the charged HTF in the thermal energy storage material includes storing the thermal energy in a packed bed of water sealed in capsules to prevent mixing with the charged HTF and to allow for volume expansion during phase change from liquid to a solid; and
the charged HTF is a 30/70 glycol/water solution.

20. The method according to claim 14, wherein for temperature regulation systems and low-temperature process heat applications where a desired storage temperature is in a range of approximately +40° F. to +200° F.:
the step of storing thermal energy from the charged HTF in the thermal energy storage material includes storing the thermal energy in a packed bed of organic paraffin wax sealed in capsules to prevent mixing with the charged HTF and to allow for volume expansion during phase change from liquid to a solid; and
the charged HTF is water.

21. The method according to claim 14, wherein for high-temperature process heat applications and heat-to-power on-demand power production applications where a desired storage temperature is greater than +200° F.:
the step of storing thermal energy from the charged HTF in the thermal energy storage material includes storing the thermal energy in a packed bed of solid rock or sand particles; and
the charged HTF is high-temperature oil.

22. A modular thermal energy storage system for storing and transferring thermal energy at a wide range of temperatures, the system comprising:
processing circuitry coupled to a non-transitory memory that stores Energy Management Software (EMS) instructions;
piping, valves, and pumps required for moving heat transfer fluid (HTF) to and from a customer load and within the system;
a thermal energy source in a first thermal energy transfer loop for adding thermal energy to the HTF for high-temperature applications and for removing thermal energy from the HTF for low-temperature applications, thereby creating charged HTF;
a heat exchanger for transferring thermal energy between the first thermal energy transfer loop and a second thermal energy transfer loop; and
a reconfigurable thermal energy storage (TES) tank in the second thermal energy transfer loop configured to store thermal energy, the TES tank comprising:
replaceable thermal energy storage material, wherein the TES tank is configured to operate with either a first type of thermal energy storage material that stores low-temperature thermal energy for applications requiring storage temperatures in a range of −30° F. to +200° F., or a second type of thermal energy storage material that stores high-temperature thermal energy for applications requiring storage temperatures greater than +200° F.;
charged HTF surrounding the thermal energy storage material for transferring thermal energy to and from the thermal energy storage material; and
at least one diffuser pipe disposed within the charged HTF and connected to input/output pipes for moving the charged HTF into and out of the TES tank during charging and discharging phases, respectively, of the system;
wherein the processing circuitry, piping, valves, pumps, thermal energy source, and TES tank are implemented in one or more insulated shipping containers, thereby making the system modular and transportable; and wherein when the processing circuitry executes the EMS instructions, the processing circuitry is caused to control the system to meet the thermal energy storage requirements of varying customer applications by:

receiving from a customer load, HTF having an input temperature;

altering the input temperature of the HTF by the thermal energy source to a desired storage temperature;

storing thermal energy from the charged HTF in the thermal energy storage material in the TES tank; and when the thermal energy stored in the TES tank is needed by the customer load:

passing a non-charged thermal fluid through the TES tank to draw out the stored thermal energy through the charged HTF; and transferring the stored thermal energy from the thermal energy storage system to the customer load by passing charged HTF from the TES tank through the heat exchanger to transfer thermal energy from the second thermal energy transfer loop to the first thermal energy transfer loop.

\* \* \* \* \*